US011089152B2

(12) United States Patent
Mumick et al.

(10) Patent No.: US 11,089,152 B2
(45) Date of Patent: Aug. 10, 2021

(54) PLACEMENT OF A MISSED CALL

(71) Applicant: Kirusa, Inc., New Providence, NJ (US)

(72) Inventors: Inderpal Singh Mumick, Berkely Heights, NJ (US); Surinder Singh Anand, Highland, NJ (US)

(73) Assignee: AAWAAZ INC., Newark, DE (US)

( * ) Notice: Subject to any disclaimer, the term of this patent is extended or adjusted under 35 U.S.C. 154(b) by 24 days.

(21) Appl. No.: 15/424,903

(22) Filed: Feb. 6, 2017

(65) Prior Publication Data

US 2017/0230499 A1    Aug. 10, 2017

Related U.S. Application Data

(60) Provisional application No. 62/292,835, filed on Feb. 8, 2016.

(51) Int. Cl.
*H04M 3/42* (2006.01)
*H04W 4/16* (2009.01)
*H04W 4/12* (2009.01)
*H04W 76/25* (2018.01)

(52) U.S. Cl.
CPC ... *H04M 3/42195* (2013.01); *H04M 3/42042* (2013.01); *H04W 4/12* (2013.01); *H04W 4/16* (2013.01); *H04W 76/25* (2018.02)

(58) Field of Classification Search
CPC combination set(s) only.
See application file for complete search history.

(56) References Cited

U.S. PATENT DOCUMENTS

| 7,496,345 | B1 * | 2/2009 | Rae | H04L 12/1432 |
| | | | | 379/114.29 |
| 8,559,984 | B2 * | 10/2013 | Anderl | H04M 3/42382 |
| | | | | 455/466 |
| 8,654,946 | B1 * | 2/2014 | Patro | H04W 4/16 |
| | | | | 379/201.01 |
| 8,825,024 | B2 | 9/2014 | Anderl et al. | |
| 2007/0091869 | A1 * | 4/2007 | Kahn | H04M 15/90 |
| | | | | 370/352 |
| 2010/0208874 | A1 * | 8/2010 | Anupam | H04M 3/42 |
| | | | | 379/88.22 |

(Continued)

FOREIGN PATENT DOCUMENTS

WO    2012125012 A1    9/2012

*Primary Examiner* — Steven S Kelley
(74) *Attorney, Agent, or Firm* — Ashok Tankha; Lipton Weinberger & Husick

(57) ABSTRACT

A method, a missed call client application (MCCA) deployed on a calling party device, and a missed call management system (MCMS) are provided for placing a missed call from a source number of the calling party device to a destination number of a called party device. The MCMS receives the source number and the destination number from the calling party device through a data network or a telecommunication network based on a presence of connectivity between the calling party device and the data network as detected by the MCCA. The MCMS places a missed call from the source number to the destination number by placing a call to the destination number with an identification of an originator of the call as the source number and terminating the call when the call successfully reaches the destination number prior to completion of the call.

15 Claims, 10 Drawing Sheets

(56) References Cited

U.S. PATENT DOCUMENTS

| | | | | |
|---|---|---|---|---|
| 2011/0243069 A1* | 10/2011 | Kahn | .................... | H04M 15/88 |
| | | | | 370/328 |
| 2011/0261792 A1* | 10/2011 | Oerton | ................ | H04M 1/2535 |
| | | | | 370/335 |
| 2014/0169539 A1* | 6/2014 | Mumick | ................. | H04M 3/48 |
| | | | | 379/88.23 |
| 2015/0087280 A1* | 3/2015 | Farrand | .................. | H04M 1/00 |
| | | | | 455/415 |
| 2016/0021256 A1* | 1/2016 | MacLean | ........... | G06Q 30/0277 |
| | | | | 705/14.73 |

* cited by examiner

PLACEMENT OF A MISSED CALL

CROSS-REFERENCE TO RELATED APPLICATIONS

This application claims priority to and the benefit of the provisional patent application No. 62/292,835 titled "Placement Of A Missed Call", filed in the United States Patent and Trademark Office on Feb. 8, 2016. The specification of the above referenced patent application is incorporated herein by reference in its entirety.

BACKGROUND

As mobile networks have evolved, calls can be made and received from phones through voice networks and data networks, for example, using a global system for mobile communications (GSM) standard, a code division multiple access (CDMA) standard, a long-term evolution (LTE) standard, etc. Applications can also be run on data enabled phones, for example, smartphones, to allow users to obtain various services through the data networks. However, to place a call from one phone to another phone, a calling party device that originates the call needs to be authenticated by a network through which the call will be connected. To be authenticated by the network, the calling party device must have either a prepaid credit balance usable towards calls or a postpaid account for billing for voice communication or data communication. If the calling party device does not have credit for voice communication, then a calling party using the calling party device is unable to place the call through a voice network. Similarly, if the calling party device does not have credit for data communication, then a calling party using the calling party device is unable to place the call or initiate any other communication through a data network. Even though missed calls to a number are free, if the calling party device does not have credit for voice communication or data communication, the calling party is unable to place a missed call. Hence, there is a need for placing a missed call in the absence of credit in the calling party device for voice communication or data communication.

In another scenario, when the calling party device has a prepaid credit balance or a postpaid billing account but does not have a facility to place a call to an international number, the calling party is unable to place a missed call to the international number. In yet another scenario, the calling party device has a prepaid credit balance or a postpaid billing account but the calling party does not want to place a paid call to another number and would instead like to place a missed call that will be free. In this scenario, the calling party cannot be sure that the call will not be charged even though the calling party only wants to place a missed call. For example, if a called party picks up the call before the calling party terminates the call, the calling party will be charged. Hence, there is a need for a method and a system that ensure that the call placed is a missed call and not a paid call.

In yet another scenario, a calling party may have multiple numbers. However, at a particular time, the calling party may have access to just one of the multiple numbers. The calling party is unable to place a missed call from one of the other numbers to which the calling party does not have access. Hence, there is a need for placing a missed call from any number owned by a calling party using a calling party device with one of the numbers owned by the calling party.

In yet another scenario, the calling party may not have a calling party device with any of the numbers but may have a smartphone or a tablet from which the calling party may want to initiate placement of a missed call. Hence, there is a need for placing a missed call from any number owned by a calling party using any other calling party device.

Hence, there is a long felt need for a method and a system that place a missed call from any one of multiple source numbers of a calling party device to a destination number of a called party device. Moreover, there is a need for a method and a system that place the missed call in the absence of credit for voice communication in the calling party device. Furthermore, there is a need for a method and a system that place the missed call in the absence of credit for data communication in the calling party device. Furthermore, there is a need for a method and a system that place the missed call from any number owned by a calling party using any other calling party device. Furthermore, there is a need for a method and a system that place the missed call to an international number in the absence of an international calling facility. Furthermore, there is a need for a method and a system that ensure that the call placed is a missed call and not a paid call.

SUMMARY OF THE INVENTION

This summary is provided to introduce a selection of concepts in a simplified form that are further disclosed in the detailed description of the invention. This summary is not intended to determine the scope of the claimed subject matter.

The method and the system disclosed herein address the above mentioned need for placing a missed call from any one of multiple source numbers of a calling party device to a destination number of a called party device. Moreover, the method and the system disclosed herein place the missed call in the absence of credit for voice communication in the calling party device. Furthermore, the method and the system disclosed herein place the missed call in the absence of credit for data communication in the calling party device. Furthermore, the method and the system disclosed herein place the missed call from any number owned by a calling party using any other calling party device. Furthermore, the method and the system disclosed herein place the missed call to an international number in the absence of an international calling facility. Furthermore, the method and the system disclosed herein ensure that the call placed is a missed call and not a paid call.

The method disclosed herein employs a missed call management system (MCMS) comprising at least one processor configured to execute computer program instructions for placing a missed call from a source number of a calling party device to a destination number of a called party device. A missed call client application (MCCA) implemented on the calling party device captures an intent of a calling party to place the missed call along with a selection of a source number from a list of authenticated source numbers associated with the calling party's user account and the destination number of the called party device. The MCCA then detects a presence of connectivity between the calling party device and a data network. The MCCA communicates a request to place a missed call to the destination number along with the source number to identify an originator of the call, and the destination number, to the MCMS through the data network or a telecommunication network based on the detected presence of connectivity between the calling party device and the data network. The MCMS receives the source number and the destination number from the MCCA on the calling party device through the data network or the telecommunication network based on the detected presence of connectivity between the calling party device and the data network. That is, the MCMS receives the source number and the destination number from the MCCA on the calling party device through the data network if the MCCA on the calling party device is connected to the data network. If the MCCA on the calling party device is not connected to the data network, the MCMS receives the source number and the destination number from the MCCA on the calling party device through the telecommunication network using, for example, a voice network, an unstructured supplementary service data (USSD) gateway, or a short message service center (SMSC). The MCMS places a missed call from the source number of the calling party device to the destination number of the called party device by placing a call to the destination number with an identification of the originator of the call as the source number and terminating the call when the call successfully reaches the destination number prior to completion of the call.

In one or more embodiments, related systems comprise circuitry and/or programming for effecting the methods disclosed herein. The circuitry and/or programming can be any combination of hardware, software, and/or firmware configured to effect the methods disclosed herein depending upon the design choices of a system designer. Also, various structural elements can be employed depending on the design choices of the system designer.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and components disclosed herein. The description of a method step or a component referenced by a numeral in a drawing is applicable to the description of that method step or component shown by that same numeral in any subsequent drawing herein.

DETAILED DESCRIPTION OF THE INVENTION

Figure 1:
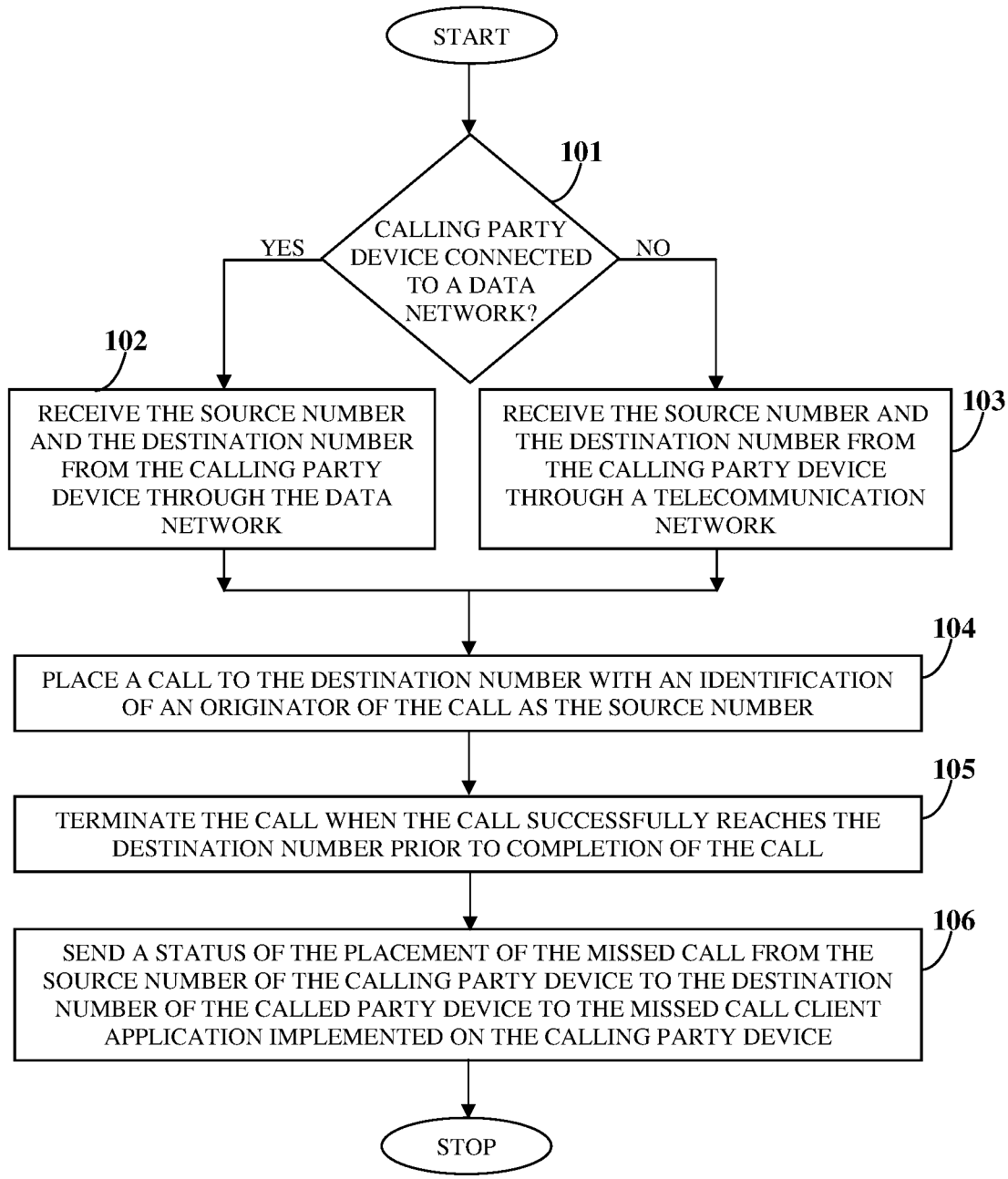
FIG. 1 illustrates a method for placing a missed call from a source number of a calling party device to a destination number of a called party device by a missed call management system.

FIG. 1 illustrates a method for placing a missed call from a source number of a calling party device to a destination number of a called party device by a missed call management system (MCMS). As used herein, "source number" refers to one of one or more numbers owned by a user of the calling party device. The source number is associated with the calling party device. Also, as used herein, "destination number" refers to a number of the called party device to which the MCMS places the missed call. Also, as used herein, "calling party" refers to a user who wants to place a missed call to a called party, using a calling party device. Also, as used herein, "called party" refers to a user who is a recipient or an intended recipient of the missed call. Also, as used herein, "calling party device" and "called party device" refer to user devices capable of communication and placing and receiving calls, for example, phones, smartphones, tablet devices, computers capable of making calls, and any other type of communication device. Also, as used herein, "user devices" refer to electronic devices, for example, personal computers, tablet computing devices, mobile computers, mobile phones, smartphones, portable computing devices, personal digital assistants, laptops, wearable computing devices such as the Google Glass® of Google Inc., the Apple Watch® of Apple Inc., etc., touch centric devices, client devices, portable electronic devices, network enabled computing devices, interactive network enabled communication devices, gaming devices, image capture devices, any other suitable computing equipment, combinations of multiple pieces of computing equipment, etc. A user device associated with the calling party is referred to as the "calling party device". A user device associated with the called party is referred to as the "called party device". The method disclosed herein employs the MCMS comprising at least one processor configured to execute computer program instructions for placing a missed call from a source number of a calling party device to a destination number of a called party device. In an embodiment, a missed call client application (MCCA) is provided on the calling party device. The MCCA is a software application downloadable and usable on the calling party device. In an embodiment, the MCCA is configured as a mobile application, for example, a smartphone application or an application for any feature phone. In an embodiment, the MCCA allows a user to initiate placement of a missed call when the user does not have access to a calling party device with any of the numbers owned by the user, but has access to a smartphone or a tablet from which the user may want to initiate placement of a missed call. The MCCA communicates with the MCMS via a network, for example, a data network.

The missed call management system (MCMS), in communication with the missed call client application (MCCA) implemented on the calling party device, authenticates and validates the source number associated with the calling party device. The MCCA and the MCMS set up a user account for the user of the calling party device using a number provided by the user. To ensure that the user owns the number provided by the user, the MCMS validates the number using one of multiple methods comprising, for example, receiving a validation code captured by the MCCA from the user and matching the received validation code with the validation code sent by the MCMS to the number via a short message service (SMS) message, receiving a validation code captured by the MCCA from the user and matching the received validation code with the validation code played on an outbound dialing (OBD) call initiated by the MCMS, receiving a confirmation from the MCCA that an SMS message sent from the MCMS to the number to be validated is received on the calling party device indicating that the calling party device contains a subscriber identity module (SIM) with the number to be validated, receiving an SMS message sent from the MCCA on the calling party device to a predetermined number and matching the source number of the SMS with the number to be validated, receiving a missed call placed by the MCCA on the calling party device to a predefined number and matching an originating number of the missed call with the number to be validated, etc. The MCMS designates the number used for setting up the user account as a primary number for the user account. The MCMS then receives any additional numbers owned by the user and validates each number using one of the methods disclosed above. The MCMS designates each of the additional numbers as secondary numbers for the user account. The MCMS allows the user to set any of the validated numbers as the primary number for the user account. Moreover, the MCMS allows the user to remove any of the secondary numbers from the user account and also the primary number after receiving another validated number as the new primary number. The MCMS authenticates the source number by checking whether the source number is one of the numbers in the user account. In an embodiment, the MCMS, in communication with the MCCA, authenticates and validates one of the numbers in the user account to obtain the source number. In an embodiment, when there is only one number in the user account, the MCMS automatically obtains the source number as the number from the user account. When there are multiple numbers in the user account, the MCCA allows the user to select any one of the numbers for placing the missed call. A generic computer using a generic program cannot authenticate and validate the source number in accordance with the method steps disclosed above.

The missed call client application (MCCA) implemented on the calling party device detects 101 a presence of connectivity between the calling party device and a data network. As used herein, "data network" refers to a communication network over which data can be transferred, for example, between user devices, between a server and a user device, etc. Examples of the data network comprise the Internet, an intranet, a wireless network, a communication network that implements Bluetooth® of Bluetooth Sig, Inc., a network that implements Wi-Fi® of Wi-Fi Alliance Corporation, a cellular operator's data network such as a telecommunication carrier's mobile data network, a third generation (3G) mobile communication network, a fourth generation (4G) mobile communication network, a fifth generation (5G) mobile communication network, a long-term evolution (LTE) mobile communication network, an ultra-wideband communication network (UWB), a wireless universal serial bus (USB) communication network, a communication network that implements ZigBee® of ZigBee Alliance Corporation, a general packet radio service (GPRS) network, an internet connection network, an infrared communication network, etc., or a network formed from any combination of these networks.

The calling party device can be connected to the Wi-Fi® network through a Wi-Fi® capability of the calling party device. The calling party device can be connected to the cellular operator's data network by possessing credit for connectivity between the calling party device and the cellular operator's data network, or by obtaining free access to the cellular operator's data network for use by the missed call management system (MCMS) through a prior authorization from the cellular operator, etc. The presence of connectivity to the data network allows the missed call client application (MCCA) to use data, an interactive voice response, a short message service, or unstructured supplementary service data to communicate with the MCMS. If the calling party device is connected to the data network, the MCMS receives 102 the source number and the destination number from the MCCA on the calling party device through the data network. The MCCA allows the user to select the destination number from a preexisting contact in an address book on the calling party device or enter the destination number on a graphical user interface (GUI) provided by the MCCA on the calling party device.

If the calling party device is not connected to the data network, the missed call management system (MCMS) receives 103 the source number and the destination number from the calling party device through a telecommunication network, for example, a voice network. As used herein, "voice network" refers to a communication network over which voice information is communicated. Examples of the voice network comprise fixed line telephone networks, cellular networks implementing, for example, a global system for mobile communications (GSM) standard, a code division multiple access (CDMA) method, etc., and other voice communication networks. The missed call client application (MCCA) places a free call from the calling party device to a predetermined toll free number to which calls can be placed even if the calling party device does not possess credit for voice communication or data communication. The calls to the predetermined toll free number are automatically routed to the MCMS. The MCMS authenticates the identity of the calling party device from caller identification information received in a signaling part of the call from the MCCA. The MCMS receives the source number and the destination number from the calling party device through the routed connection, for example, via dual-tone multi-frequency (DTMF) signaling. The MCCA places the free call from the calling party device to the toll free number, has the free call routed to the MCMS, and communicates with the MCMS without requiring any input from the user of the calling party device. Moreover, if the source number for the missed call is the same as an international mobile subscriber identity (IMSI) number stored in a subscriber identity module (SIM) used by the calling party device to place the call, the MCMS does not require explicit communication of the source number from the calling party device, for example, via DTMF signaling, to the MCMS as the MCMS receives the source number from an identification of the originator of the free call to the toll free number, for example, through a caller identification facility associated with the calling party device.

In an embodiment, the missed call management system (MCMS) receives the source number and the destination number from the calling party device through an unstructured supplementary service data (USSD) gateway using a USSD protocol. In another embodiment, the MCMS receives the source number and the destination number from the calling party device through a short message service center (SMSC) by sending messages to a zero-rated number through the missed call client application implemented on the calling party device. The data inputted to the MCMS, for example, the source number and the destination number received from the missed call client application deployed on the calling party device is transformed, processed, and executed by an algorithm in the MCMS for placement of the missed call as disclosed below.

The missed call management system (MCMS) employs a separate method for processing and parsing the input received from the missed call client application (MCCA) deployed on the calling party device to extract the source number and the destination number. This method is different for each mode of communication. Consider an example where the source number is "19081231234" and the destination number is "2348012341234". In an embodiment, the MCCA sends a JavaScript object notation (JSON) object to the MCMS over a data network in the following format:

```
{
    destination_number:"2348012341234",
    source_number:"19081231234"
}
```

In an embodiment where the source number is the same as the primary number of the user account, the missed call client application (MCCA) optionally sends only the destination number in the JavaScript object notation (JSON) object to the missed call management system (MCMS). If the MCMS does not receive the source number in the JSON object, the MCMS uses the primary number of the user account associated by the MCCA as the source number. If the source number is same as the primary number, the MCCA sends the JSON object to the MCMS in the following format:

```
{
    destination_number:"2348012341234"
}
```

Over an interactive voice response (IVR), the missed call client application (MCCA) calls a toll free number and then sends the destination number, and optionally the source number using dual-tone multi-frequency (DTMF) signaling. For example, the MCCA sends digits 2348012341234, the destination number followed by # followed by 19081231234, the source number. The source number is optional if the MCCA is initiating the IVR call from the calling party device with the subscriber identity module (SIM) associated with the source number. In another example, over the IVR, if the toll free number is 18001231234, a dial string called by the MCCA is of the form 18001231234,2348012341234#19081231234#. The MCMS receives the digits dialed by the MCCA after the pause as a DTMF input, and parses the digits to extract the destination number and the source number. If the MCMS does not receive the source number in the dial string, the MCMS uses the originator of the call received from the MCCA as the source number.

The missed call management system (MCMS) employs a similar method for short message service (SMS) and unstructured supplementary service data (USSD). The examples for SMS and USSD are disclosed below. For the SMS, the missed call client application (MCCA) sends an SMS message to the toll free number with a message along the following lines:

TO 2348012341234 FROM 19081231234

In an embodiment, when a short message service (SMS) message is sent by the missed call client application (MCCA) on the calling party device that has the subscriber identity module (SIM) with the source number to the missed call management system (MCMS), the MCCA sends the SMS message with only the destination number in the message along the following lines:

TO 2348012341234

If the missed call management system (MCMS) does not receive the source number in the short message service (SMS) message, the MCMS determines the source number based on the identity of the calling party device.

For unstructured supplementary service data (USSD), the missed call client application (MCCA) dials a USSD string comprising a USSD command assigned to the missed call management system (MCMS), followed by the destination number and optionally the source number, with * as a separator and # as a terminator. For example, the USSD string *6477*2348012341234*19081231234# comprises a command, "*6477*", followed by the destination number 2348012341234, followed by the source number 19081231234, with * as the separator and # as the terminator. In an embodiment, the MCCA sends the USSD string as *6477*2348012341234# where the source number is not included, but is determined based on the identity of the calling party device.

The missed call management system (MCMS) places 104 a call to the destination number with the identification of the originator of the call as the source number. In an embodiment, the MCMS places a short outbound call to the destination number through a telecommunication network. In this embodiment, the MCMS employs an integrated services digital network (ISDN) and an integrated services user part (ISUP) signaling to place the short outbound call. The MCMS sends an initial address message (IAM) with the number of the calling party device being set as the source number received from the missed call client application (MCCA), and the number of the called party device being set as the destination number received from the MCCA. The MCMS monitors the progress of the call to receive an indication of the call successfully reaching the destination number, for example, a ringtone of the called party device in the form of an address completion message (ACM) received by the MCMS from the data network with a called party status set as "Subscriber Free" indicating that the called party device has been alerted. In an embodiment, the MCMS monitors the progress of the call to receive an indication of the call successfully reaching the destination number, for example, in the form of a call progress (CPG) message with an "Alerting" status received by the MCMS after receiving an "Early ACM" with the called party status set as "No Indication". In another embodiment, the MCMS employs a session initiation protocol (SIP) to place the short outbound call. The MCMS terminates 105 the call when the call successfully reaches the destination number, prior to completion of the call, thereby placing the missed call from the source number of the calling party device to the destination number of the called party device. The missed call placed by the MCMS is such that an indication of the missed call appears on a call log of the called party device. The indication of the missed call placed by the MCMS is identical to that of a call from the calling party device missed by the called party device due to a failure to pick up the call by the called party device. In an embodiment, the MCMS sends 106 a status of the placement of the missed call from the source number of the calling party device to the destination number of the called party device to the missed call client application (MCCA) implemented on the calling party device. A generic computer using a generic program cannot perform the method steps 104, 105, and 106 in accordance with the method steps disclosed above.

In an embodiment, when the placement of the call to the destination number by the missed call management system (MCMS) is unsuccessful, that is, when the MCMS is unable to ring, that is, connect to, the destination number, for example, because the destination number is out of coverage area of the telecommunication network or the called party device with the destination number is switched off, the MCMS sends a missed call alert notification, for example, as a short message service (SMS) message to the destination number indicating that the source number was trying to place a call to the destination number at a specified time. The MCMS authenticates the source number by checking whether the source number is one of the numbers in the user account independent of the numbers present in the calling party device. Hence, the MCMS places the missed call from one of multiple source numbers owned by the user of the calling party device to a destination number of a called party device based on a selection of the source number for the missed call by the user of the calling party device. Moreover, the MCMS places the missed call independent of a presence or an absence of credit for one or more of a voice communication, a short message service (SMS) communication, and a data communication in the calling party device.

In an embodiment, the missed call management system (MCMS) places the missed call from the source number of the calling party device to the destination number of the called party device using a missed call server that is in the same geographical location as that of a telecommunication network or a data network of the source number. In an example, when the user of the calling party device intends to place a missed call to an international number, the MCMS uses the missed call server that is in the same geographical location as that of the telecommunication network or the data network of the source number. In another embodiment, the MCMS places the missed call from the source number of the calling party device to the destination number of the called party device using a missed call server that is in the same geographical location as that of a telecommunication network or a data network of the destination number. In another embodiment, the MCMS places the missed call from the source number of the calling party device to the destination number of the called party device using a missed call server that is in a geographical location different from the geographical location of the telecommunication network or the data network of the source number. In another embodiment, the MCMS places the missed call from the source number of the calling party device to the destination number of the called party device using a missed call server that is in a geographical location different from the geographical location of the telecommunication network or the data network of the destination number. In another embodiment, the MCMS places the missed call from the source number of the calling party device to the destination number of the called party device using a missed call server that is in the same geographical location as that of the telecommunication network or the data network of both the source number and the destination number. In another embodiment, the MCMS places the missed call from the source number of the calling party device to the destination number of the called party device using a missed call server that is in a geographical location different from the geographical location of the telecommunication network or the data network of both the source number and the destination number. The selection of the geographical location of the telecommunication network or the data network depends, for example, on the relationship between a provider of the missed call placement service implemented by the MCMS and the telecommunication networks or data networks available in different geographical localities, the cost of using various telecommunication networks or data networks, and the quality of the service provided by the telecommunication networks or data networks. The MCMS places the missed call to the international number through the missed call server. Hence, the MCMS places the missed call to the international number independent of a presence of a facility for calling international numbers in the calling party device. Furthermore, the MCMS ensures that the call placed to the destination number is a missed call that does not incur a cost charge by automatically terminating the call when the call successfully reaches the destination number prior to completion of the call without a need for any user input.

In an embodiment, the missed call management system (MCMS) determines whether the calling party associated with the calling party device and the called party associated with the called party device are qualified for the placement of the missed call from the source number of the calling party device to the destination number of the called party device at a particular time based on one or more of multiple predetermined parameters. The predetermined parameters comprise, for example, time of reception of a missed call request from the missed call client application, time of placement of the missed call, call history, a profile of the calling party, a profile of the called party, time of day, load on the MCMS also referred to as "system load", etc. In an example, the MCMS determines that the calling party or the calling party device, as identified by the source number, does not qualify for placing the missed call at a particular time because of a high frequency of missed call requests to one or more destination numbers at a particular time. In another example, the MCMS determines that the called party or the called party device, as identified by the destination number, does not qualify for placement of the missed call at a particular time because of receiving a recent request from the destination number for placing a missed call indicating that the called party device as identified by the destination number does not have sufficient credit to place a return call to the calling party device.

For each user identified by a number, the missed call management system (MCMS) dynamically generates a profile based on different data collected about the user. In an embodiment, the MCMS comprises a profiling module that collects profile data of the user to dynamically generate the profile. The profile data comprises, for example, the user's call history comprising calls attempted and calls answered, duration of the answered calls, calls attempted but not answered due to the called party device not being reachable, the called party device being busy, or the called party not answering the calls, calls attempted but not completed due to the calling party hanging up before the called party answers the calls, calls attempted but failed due to an insufficient balance in the user's prepaid account, a category of the destination number, for example, on-net calls, national off-net calls, or international calls attempted and the calls answered, etc. As used herein, "on-net calls" refer to calls between a calling party and a called party subscribed to the same carrier network. Also, as used herein, "off-net calls" refer to calls between a calling party and a called party subscribed to different carrier networks. The profile data further comprises, for example, data about calls attempted and calls answered where the user is the called party, data about the frequency and amount of recharges to the user's prepaid account, and a snapshot of balance in the user's prepaid account at a different time. The profiling module collects the profile data as part of integrating the MCMS with a carrier network. In an embodiment, the profiling module collects the profile data as part of other services being offered to the subscribers of the carrier network.

The missed call management system (MCMS) determines whether a user, that is, a calling party or a called party is qualified for the placement of the missed call from the source number of a calling party device to the destination number of a called party device based on the profile data. In an embodiment, the MCMS provides a high qualification score to the called party as a potential recipient of a missed call based on multiple factors comprising, for example, factors that indicate a likelihood of the called party making a callback such as a high frequency of call attempts that are successfully answered, a high average recharge amount, a higher average balance in the called party's prepaid account, a higher average amount recharged and/or spent per unit time, a high average call duration of calls attempted and calls answered, a low percentage of calls attempted with an insufficient balance, the length of using the carrier network's service and making the answered calls, etc. The factors that indicate a likelihood of the called party receiving the missed call comprise, for example, percentage of call attempts to the called party device that are successfully answered and call attempts that are incomplete due to the called party device not being reachable, or due to the called party device being busy, or due to the called party not answering the call. The MCMS provides a high qualification score to the calling party as a potential sender of the missed call based on multiple factors comprising, for example, a high frequency of receiving calls that are answered, a high rate of answering incoming calls, a high average call duration of the incoming calls, a low rate of attempting calls that are disconnected by the calling party, length of using the carrier network's service, making and receiving answered calls, etc. The MCMS computes a qualification score for a user, both as a potential sender of a missed call and as a potential recipient of a missed call. The MCMS calculates and updates the qualification score dynamically based on processing of a substantial amount of data points in the profile data.

In an embodiment, the missed call management system (MCMS) computes multiple sub-scores as part of the qualification score. The sub-scores comprise long term sub-scores and recent sub-scores. The MCMS computes the long term sub-scores by processing the collected profile data, with the recent profile data being given a slightly higher weightage compared to the previous profile data. One of the long term sub-scores determines whether the called party, that is, the recipient of the missed call is likely to have a sufficient balance to make a callback. Another long term sub-score determines an expected value of the callback from the called party and is based on data points in the profile data that indicate whether calls made by the calling party are answered by the called party and the average call duration of the calls. The recent sub-scores are substantially based on recent data points in the profile data. One recent sub-score determines whether the called party, that is, the recipient of the missed call has sufficient balance to make a callback and is based on data points comprising, for example, type of the most recent call attempt, that is, the call attempted and the call answered, or the call attempted but not answered, or the call attempted but failed due to an insufficient balance, the most recent known prepaid account balance of the called party, etc. Another recent sub-score determines whether the called party is likely to receive the missed call as a recipient and is based on a recent call attempt by the called party, or a recent call attempt received and answered by the called party, or a recent call attempt made to the called party that was incomplete due to the called party device not being reachable, or due to the called party device being busy, or due to the called party not answering the call.

In another embodiment, the missed call management system (MCMS) has a capacity for placing missed calls, for example, a capacity of about 100,000 missed call attempts in an hour, or a maximum of 50 concurrent missed call attempts. Based on a current rate of receiving call attempts with insufficient balance, the MCMS adjusts a threshold for qualifying a user, that is, a calling party or a called party for placing a missed call upward or downward to not exceed the available capacity and to not leave the available capacity unused. For example, when the rate of receiving call attempts with insufficient balance is high, the MCMS adjusts the threshold for qualifying a user to place the missed call upward to keep the number of missed call attempts below the available capacity. When the rate of receiving call attempts with insufficient balance is low, the MCMS lowers the threshold for qualifying the user to place the missed call without falling below a minimum threshold and without violating other business rules to take advantage of the higher capacity available. A generic computer using a generic program cannot determine whether the calling party or the calling party device and the called party or the called party device are qualified for the placement of the missed call from the source number of the calling party device to the destination number of the called party device based on one or more of multiple predetermined parameters in accordance with the method steps disclosed above.

Consider an example where the missed call management system (MCMS) is in operable communication with the missed call client application (MCCA) configured, for example, as a mobile application such as a smartphone application or an application for any phone that is data enabled and installed on a phone belonging to a user. The MCMS places missed calls from any one of multiple numbers owned by the user to any other number B. The MCMS implements a method that allows a user to place a missed call from a mobile number A1 to any other number B by using the MCCA deployed on the phone to specify the mobile number A1 and the number B. The MCCA can operate on smartphones and on feature phones. The MCCA operates with or without a data network. The user sets up a user account in the MCCA using a mobile number A1 owned by the user. At any time when the user wants to place a missed call to the number B, the user uses the MCCA to indicate an intention to place a missed call from the mobile number A1 to the number B. The MCCA communicates the intention of the user to place the missed call from the mobile number A1 to the number B to the MCMS. The communication between the MCCA and the MCMS occurs over a data network or a telecommunication network such as a voice network, regardless of whether the user has voice credit or not, and regardless of whether the user has data credit or not. The MCCA communicates with the MCMS over the telecommunication network or the data network managed by a carrier network. In an embodiment, the MCCA communicates with the MCMS over a data network, for example, the Wi-Fi® network that is not managed by a carrier network.

The missed call management system (MCMS) acquires the mobile number A1 as the source number and the number B as the destination number from the MCCA. The MCMS then places a short outbound call to the number B as the destination number, and masks its source number to be the mobile number A1. That is, the MCMS changes the automatic number identification (ANI) to the mobile number A1. The MCMS monitors the progress of the call, waits till a phone with the number B rings, and then immediately drops the call. A user of the phone with the number B believes that he or she has received a call from the mobile number A1. The call appears on a call log of the user's phone with the number B as a missed call, as if the user of the phone with the mobile number A1 had called the user of the phone with the number B and the user of the phone with the number B had not picked up the phone and not accepted the call.

The above scenario works even if the phone with the mobile number A1 does not have any credit for making voice calls. Consider the following cases: In one case, the user is connected to a data network. This may take several forms, for example, connectivity to a Wi-Fi® network, connectivity to a cellular operator's data network using a data plan for which the user of the phone with the mobile number A1 has already paid, or for which the user has credit, or connectivity to the cellular operator's data network with the cellular operator having white labeled the missed call client application (MCCA), that is, made use of the MCCA on the cellular operator's data network free of charge. In this case, the missed call management system (MCMS) receives information about the mobile number A1 and the number B from the MCCA using the data network.

Consider another example where the user's phone is not connected to a data network, but is connected to a telecommunication network, for example, a voice network. The missed call client application (MCCA) implemented on the user's phone detects that there is no data connectivity, and makes a voice call to a preconfigured toll free number, to which calls can be made even if the user does not have credit for a voice call since the number is toll free. Calls to this toll free number are routed to the missed call management system (MCMS), and the MCCA then enters the mobile number A1 and the number B via dual-tone multi-frequency (DTMF) signaling. These processes occur in the background, without the user having to dial these numbers. If the mobile number A1 is in the phone that makes the voice call to the toll free number, then the mobile number A1 does not need to be entered using the DTMF signaling as the mobile number A1 can be read by the MCMS from a caller identification of the incoming call to the toll free number.

Consider another example where the user's phone is not connected to a data network, but is connected to a telecommunication network, for example, a global system for mobile communications (GSM) network, using unstructured supplementary service data (USSD). The missed call client application (MCCA) detects that there is no data connectivity, and sends a USSD code to the telecommunication network, which includes the mobile number A1 of the user and the number B to which the user wants to send a missed call. The USSD code is routed to the missed call management system (MCMS). These processes occur in the background, without the user having to dial the USSD code. Moreover, if the mobile number A1 is in the phone of the user, then the mobile number A1 does not need to be entered as a part of the USSD code. The MCMS reads the mobile number A1 from an identifier (ID) from which the USSD code is coming. An example of a USSD command that can be used comprises characters *6477* followed by the source number followed by the separator * and then the destination number followed by the terminator # as follows:

*6477*<Source Number>*<Destination Number>#

An unstructured supplementary service data (USSD) server in the telecommunication network processes the USSD command and passes the processed USSD command via the USSD gateway to the missed call management system (MCMS). The source number of the calling party device and the destination number of the called party device are therefore communicated to the MCMS.

Consider another example where the user's phone is not connected to a data network, but is able to send short message service (SMS) messages to a zero-rated number through the telecommunication network. The missed call client application (MCCA) on the user's phone detects that there is no data connectivity, and sends an SMS message to the zero-rated number. The SMS message includes the mobile number A1 of the user and the number B to which the user wants to send a missed call. The SMS message is routed to the missed call management system (MCMS). The aforementioned communications occur in the background, without the user having to type the SMS message. An example of an SMS message sent to the zero-rated number by the MCCA is as follows:

"FROM <Source Number> TO <Destination Number>", or
"TO <Destination Number>"

A short message service center (SMSC) server in the telecommunication network processes the short message service (SMS) message and passes the processed SMS message to the missed call management system (MCMS). The calling party number, that is, the source number, and the called party number, that is, the destination number are therefore communicated to the MCMS.

Figure 2:
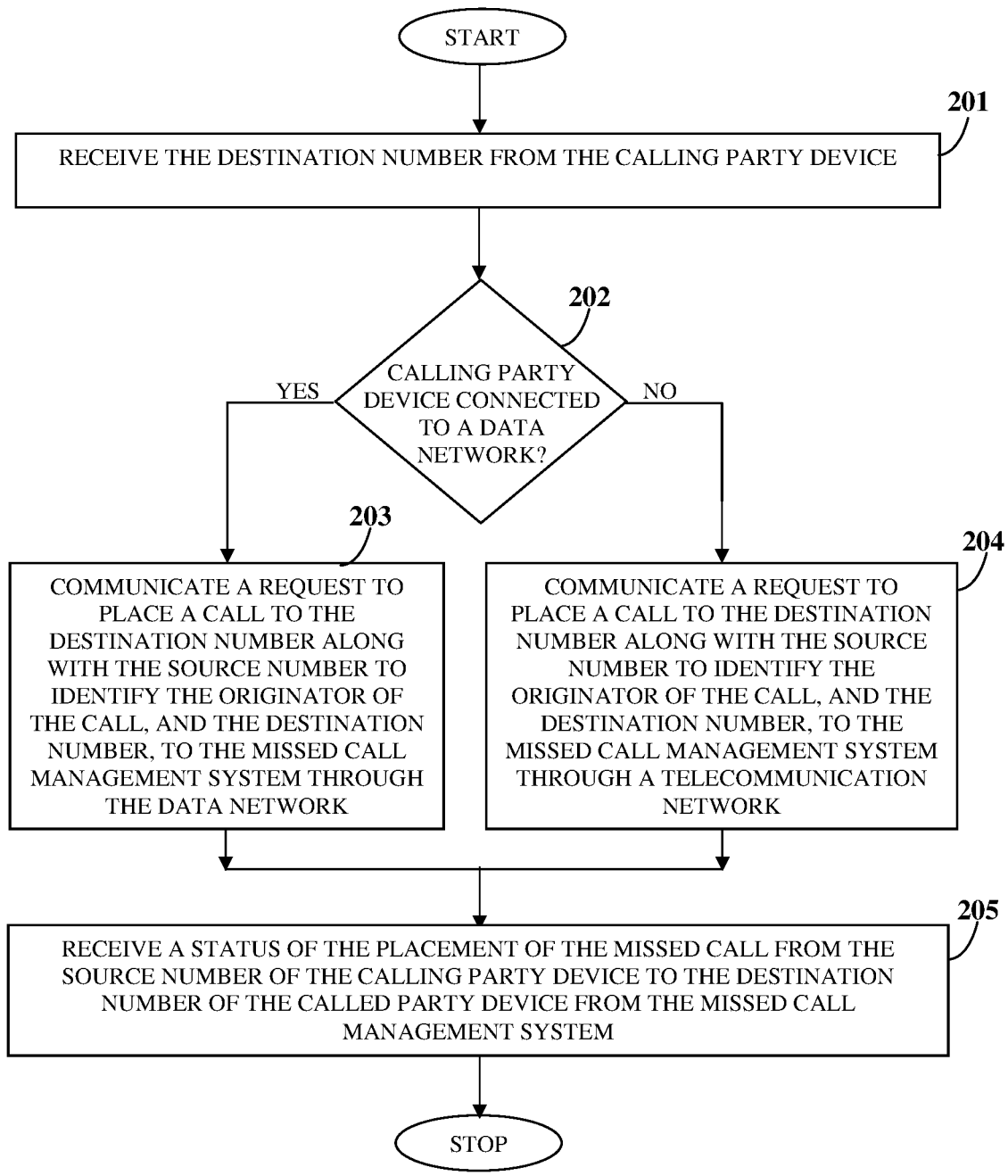
FIG. 2 illustrates a method for placing a missed call from a source number of a calling party device to a destination number of a called party device using a missed call client application deployed on the calling party device.

FIG. 2 illustrates a method for placing a missed call from a source number of a calling party device to a destination number of a called party device using the missed call client application (MCCA) deployed on the calling party device. In the method disclosed herein, the MCCA is executable by at least one processor configured to execute computer program instructions for placing a missed call from a source number of the calling party device to a destination number of the called party device. The MCCA implemented on the calling party device captures the intent of the user to place a missed call along with a selection of a source number from a list of authenticated source numbers associated with the user account and the destination number of the called party device. In an embodiment, the MCCA, in communication with the missed call management system (MCMS), authenticates one of multiple numbers of the calling party device to obtain the source number. The MCCA receives 201 the destination number from the calling party device via a graphical user interface (GUI) provided by the MCCA on the calling party device. The MCCA detects 202 a presence of connectivity between the calling party device and a data network. If the calling party device is connected to the data network, the MCCA communicates 203 a request to place a call to the destination number along with the source number to identify an originator of the call, and the destination number, to the MCMS through the data network. If the calling party device is not connected to the data network, the MCCA communicates 204 a request to place a call to the destination number along with the source number to identify the originator of the call, and the destination number, to the MCMS through a telecommunication network. The MCMS places the call to the destination number and terminates the call when the call successfully reaches the destination number prior to completion of the call, thereby placing the missed call from the source number of the calling party device to the destination number of the called party device as disclosed in the detailed description of FIG. 1. The MCMS sends the status of the placement of the missed call to the MCCA. The MCCA receives 205 the status of the placement of the missed call from the source number of the calling party device to the destination number of the called party device from the MCMS.

In an embodiment where the calling party device attempts to contact the called party device, for example, by placing a call, sending a short message service (SMS) message, sending an instant message over the data network, etc., but fails due to an absence of credit for a voice communication, and/or an SMS communication, and/or a data communication in the calling party device, the missed call client application (MCCA) implemented on the calling party device detects the unsuccessful attempt by the calling party device to contact the called party device from the source number to the destination number. In an embodiment, on detecting the unsuccessful attempt by the calling party device to contact the called party device from the source number to the destination number, the MCCA communicates with a contact completion application similar to a call completion application implemented on the calling party device as disclosed in non-provisional patent application Ser. No. 14/105,158 titled "Sender Driven Call Completion System" filed in the United States Patent and Trademark Office on Dec. 12, 2013, now issued as U.S. Pat. No. 9,185,227 and incorporated herein by reference in its entirety, for providing options to the user of the calling party device to contact the called party device. The contact completion application generates a request defining multiple options for contacting the called party device and renders the generated request on a graphical user interface (GUI) of the calling party device. One of the options is, for example, sending a missed call alert notification to the called party device by placement of a missed call from the source number of the calling party device to the destination number of the called party device by the missed call management system (MCMS). The rendered request prompts the user of the calling party device to select one of the options via the GUI. When the user selects the option to send a missed call alert notification to the called party device, the MCCA communicates a request to the MCMS to initiate placement of a missed call from the source number of the calling party device to the destination number of the called party device.

The missed call management system (MCMS) implements one or more specific computer programs for placing a missed call from a source number of a calling party device to a destination number of a called party device. The MCMS receives a request from the missed call client application deployed on the calling party device to place the missed call from any number owned by a calling party using any other calling party device. The MCMS processes and transforms the request with the source number and the destination number for placing the missed call to the destination number of the called party device with an identification of an originator of the call as the source number.

The method disclosed herein improves the functionality of the computer and provides an improvement in communication related technology related to placement of a missed call from a source number of a calling party device to a destination number of a called party device as follows: On implementing the method disclosed herein, the missed call management system (MCMS), in communication with the missed call client application (MCCA) deployed on the calling party device, places a free call to a toll free number without requiring any input from a calling party and without credit for voice communication or data communication. The MCMS monitors the progress of the call successfully reaching the destination number, terminates the call prior to completion of the call, and sends a status of the placement of the missed call from the source number and the destination number to the MCCA on the calling party device. The MCMS profiles and scores the calling party and the called party identified by the source number and the destination number respectively, to determine whether the calling party and the called party qualify for the placement of the missed call. The MCMS, through the use of separate and autonomous computer programs, places a missed call (a) from any one of multiple source numbers associated with the calling party device to the destination number of the called party device with an identification of an originator of the call as the source number in the absence of credit for voice communication or data communication in the calling party device, or (b) from any number owned by a calling party using any other calling party device. The MCMS, through the use of separate and autonomous computer programs, also places a missed call to an international number in the absence of an international calling facility, and ensures that the call placed to the international number or any destination number is a missed call and not a paid call. The MCMS employs the missed call server and a missed call media platform to transform the user's intent to place a missed call to a called party device in the absence of credit for voice communication or data communication, or in the absence of an international calling facility, or in the absence of access to one of the numbers or one or more of multiple calling party devices owned by the user, into a placement of the missed call from a source number of a calling party device to a destination number of the called party device as disclosed in the detailed descriptions of FIGS. 3-5. The method disclosed herein provides an improvement in how a short outbound call is placed, monitored, and terminated as disclosed in the detailed description of FIG. 1, to ensure that the call attempted is a missed call and not an answered call. Furthermore, the method disclosed herein provides an improvement in taking a request for placing a missed call from a calling party using a calling party device and using the missed call server of the MCMS to place the missed call without the calling party device being an active element while the missed call is being placed. The MCCA in the calling party device communicates the request to the MCMS and then waits to receive the status of the missed call request from the MCMS.

The focus of the method and the missed call management system (MCMS) disclosed herein is on an improvement to communication technology and computer functionalities, and not on tasks for which a generic computer is used in its ordinary capacity. Accordingly, the method and the MCMS disclosed herein are not directed to an abstract idea. Rather, the method and the MCMS disclosed herein are directed to a specific improvement to the way the processors in the MCMS and the calling party device operate, embodied in, for example, authenticating and validating the source number received from the missed call client application deployed on the calling party device, determining whether the calling party and the called party are qualified for placement of the missed call, placing a missed call request to a missed call server application deployed on the missed call server and a missed call placement application deployed on the missed call media platform, detecting the presence of communication between the calling party device, the missed call server, the missed call media platform, and the called party device, detecting a presence of connectivity between the calling party device and a data network, placing a call to the destination number with an identification of an originator of the call as the source number, and terminating the call when the call successfully reaches the destination number prior to completion of the call, thereby placing the missed call from the source number of the calling party device to the destination number of the called party device.

In the method disclosed herein, the design and flow of data and interactions between the calling party device, the called party device, and the missed call management system (MCMS) are deliberate, designed, and directed. The source number and the destination number received from the missed call client application deployed on the calling party device are processed by the MCMS to steer the MCMS towards a finite set of predictable outcomes. The MCMS implements one or more specific computer programs for determining whether the calling party device and the called party device qualify for placement of the missed call from the source number of the calling party device to the destination number of the called party device, and subsequently placing the missed call.

The interactions between the calling party device, the called party device, and the missed call management system (MCMS) allow the MCMS to place the missed call from the source number to the destination number using a missed call server that is in the same or different geographical location as that of a telecommunication network or a data network of the source number and/or the destination number. From this data, the MCMS, through the use of other, separate and autonomous computer programs, places the missed call to an international number independent of a presence of a facility for calling international numbers in the calling party device. To receive the source number and the destination number from the missed call client application (MCCA) deployed on the calling party device, authenticate and validate one of the numbers of the calling party device to obtain the source number, send a request to the MCMS to place the missed call to the destination number of the called party device, detect a presence of connectivity between the calling party device and a data network, determine whether the calling party device and the called party device are qualified for the placement of the missed call from the source number of the calling party device to the destination number of the called party device, place a call to the destination number with an identification of an originator of the call as the source number, monitor the progress of the call to receive an indication of the call successfully reaching the destination number, terminate the call when the call successfully reaches the destination number prior to completion of the call, thereby placing the missed call from the source number of the calling party device to the destination number of the called party device, send a missed call alert notification to the destination number when the placement of the call to the destination number is unsuccessful, and providing options to contact the called party device on detection of an unsuccessful attempt by the calling party device to contact the called party device require ten or more separate computer programs and subprograms, the execution of which cannot be performed by a person using a generic computer with a generic program. The steps performed by the MCCA and the MCMS disclosed above are tangible, provide useful results, and are not abstract. The software implementation of the MCCA and the MCMS is an improvement in computer related and communication technology.

Figure 3:
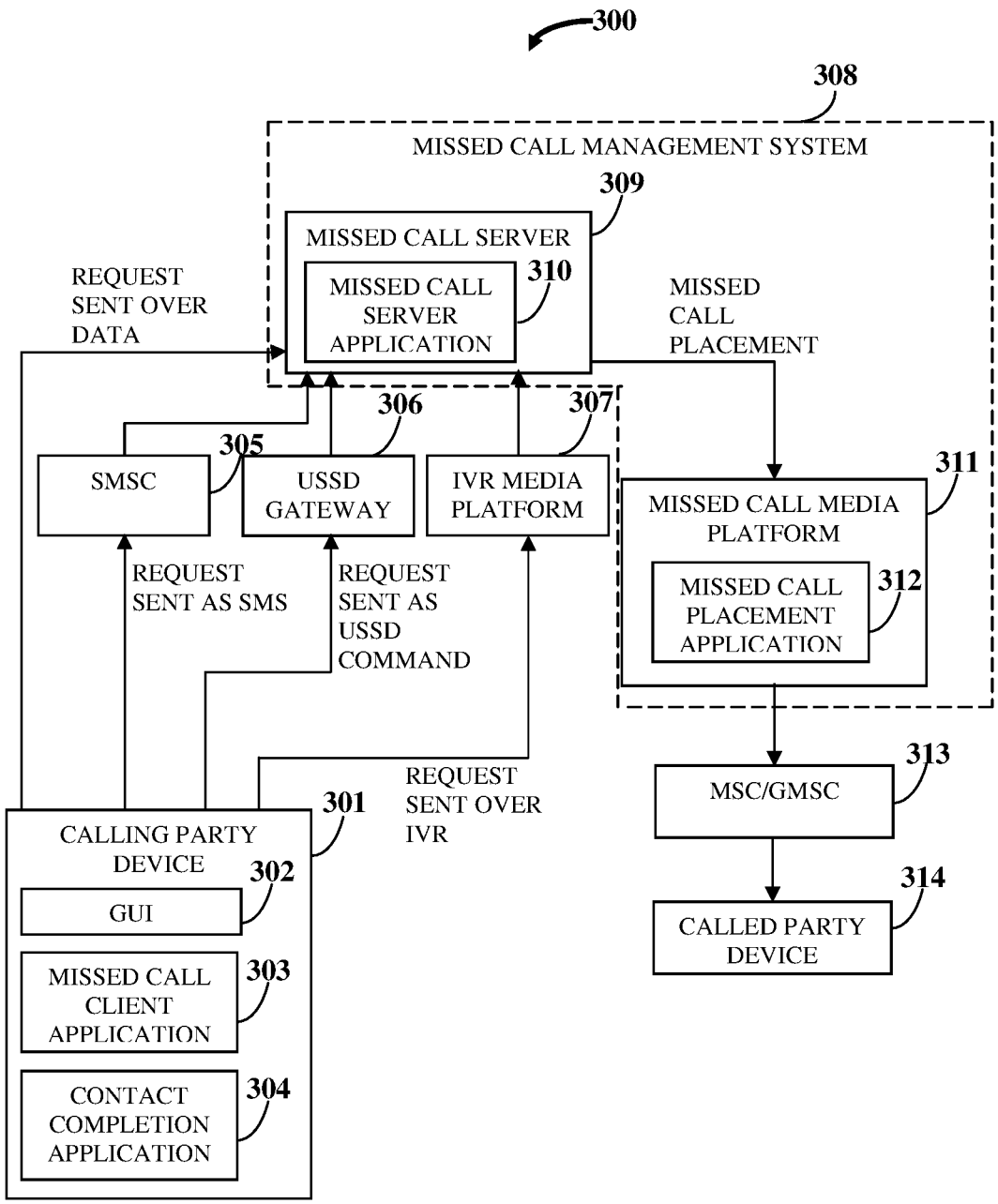
FIG. 3 exemplarily illustrates a system for placing a missed call from a source number of a calling party device to a destination number of a called party device.

FIG. 3 exemplarily illustrates a system 300 for placing a missed call from a source number of a calling party device 301 to a destination number of a called party device 314. The system 300 disclosed herein comprises the missed call client application (MCCA) 303 implemented on the calling party device 301 and the missed call management system (MCMS) 308. In an embodiment, the MCMS 308 is a server side system comprising the missed call server 309 with the missed call server application 310, and a missed call media platform 311 with a missed call placement application 312. The calling party device 301 comprises the MCCA 303 for placement of the missed call and displays a graphical user interface (GUI) 302 provided by the MCCA 303. In an embodiment, the calling party device 301 further comprises the contact completion application 304 operably coupled to the MCCA 303. On detecting an unsuccessful attempt by the calling party device 301 to contact the called party device 314 from the source number to the destination number, the contact completion application 304 prompts the user of the calling party device 301 to select one of multiple options, for example, sending a missed call alert notification to the called party device 314. When the user selects the option to send the missed call alert notification to the called party device 314 via the GUI 302, the MCCA 303 on the calling party device 301 requests the missed call server 309, on which the missed call server application 310 is implemented, to place a missed call to the called party device 314.

The missed call client application (MCCA) 303 sends a request for placing the missed call to the missed call server 309 as a data communication over a data network if the calling party device 301 is connected to the data network. In an embodiment, if the calling party device 301 is not connected to the data network, the MCCA 303 sends a request for placing the missed call to the missed call server 309, for example, as a short message service (SMS) message through a short message service center (SMSC) 305. In another embodiment, if the calling party device 301 is not connected to the data network, the MCCA 303 sends a request for placing the missed call to the missed call server 309, for example, as an unstructured supplementary service data (USSD) command through a USSD gateway 306, or in another embodiment, through an interactive voice response (IVR) request through an IVR media platform 307. The missed call server 309 communicates with the missed call media platform 311, on which the missed call placement application 312 is implemented, for placement of the missed call. The missed call media platform 311 places the missed call to the called party device 314 with an identification of an originator of the call as the source number, for example, through a mobile switching center (MSC) or a gateway mobile switching center (GMSC) 313.

A generic device using a generic program cannot interface instantaneously with the missed call server 309 and the missed call media platform 311 of the missed call management system (MCMS) 308 for placing a missed call from a source number of the calling party device 301 to a destination number of the called party device 314. In the system 300 disclosed herein, the missed call server application 310 of the missed call server 309 interfaces with the missed call client application (MCCA) 303 on the calling party device 301 and the missed call placement application 312 of the missed call media platform 311 for placing the missed call from the source number of the calling party device 301 to the destination number of the called party device 314, and therefore the system 300 disclosed herein uses more than one specifically programmed computer system.

Figure 4:
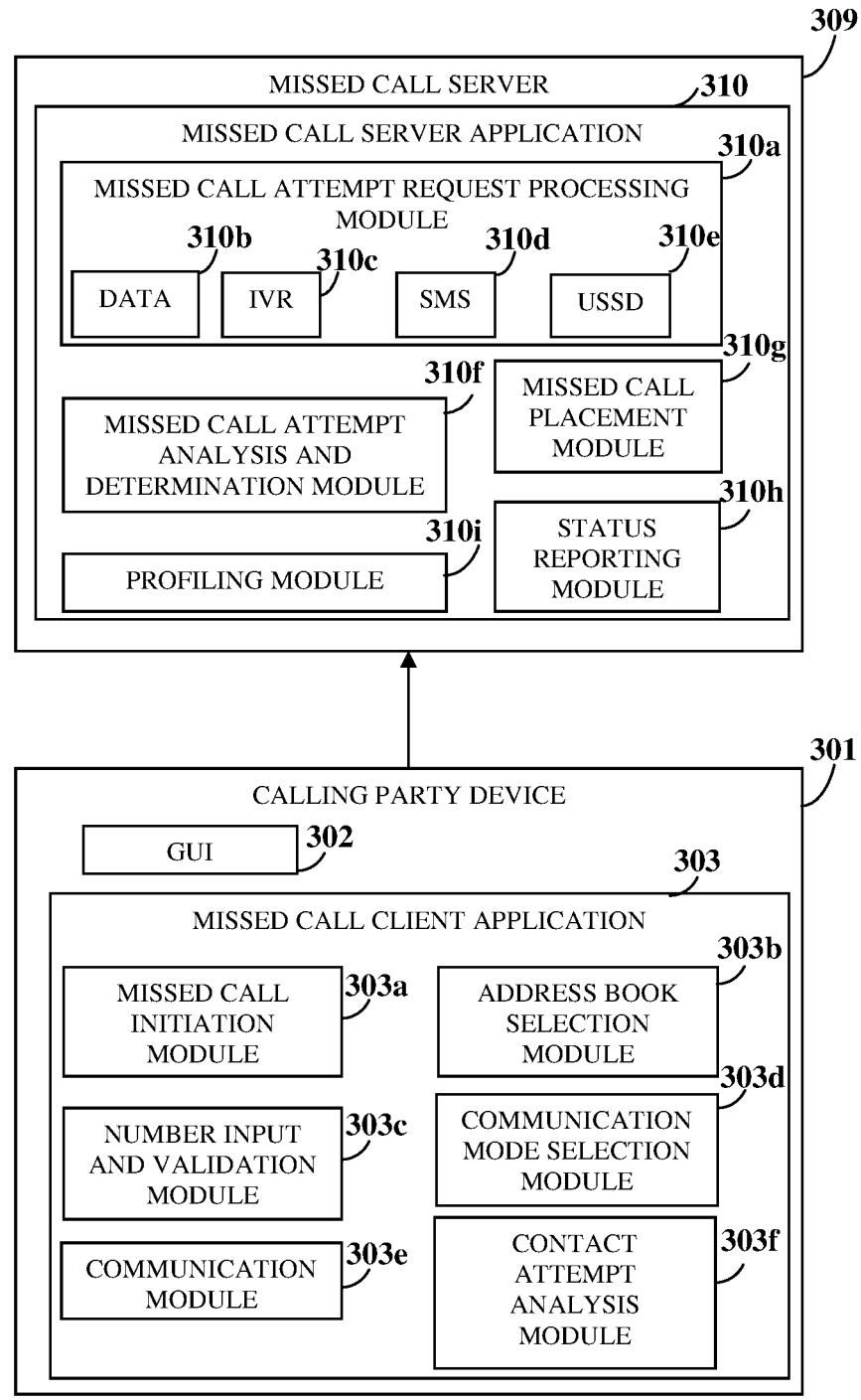
FIG. 4 exemplarily illustrates communication between the missed call client application implemented on a calling party device and a missed call server application implemented on a missed call server of the missed call management system.

FIG. 4 exemplarily illustrates communication between the missed call client application (MCCA) 303 implemented on a calling party device 301 and the missed call server application 310 implemented on the missed call server 309 of the missed call management system (MCMS) 308 exemplarily illustrated in FIG. 3. In an embodiment, the MCCA 303 comprises a missed call initiation module 303a, an address book selection module 303b, a number input and validation module 303c, a communication mode selection module 303d, a communication module 303e, and a contact attempt analysis module 303f. The missed call initiation module 303a initiates a request for a missed call from a source number of the calling party device 301 to a destination number of a called party device 314 exemplarily illustrated in FIG. 3. The address book selection module 303b stores the source number if available on the calling party device 301 and allows selection of the destination number by a user of the calling party device 301 via the graphical user interface (GUI) 302. The number input and validation module 303c receives the source number from the user of the calling party device 301 via the GUI 302, if not already available, and validates the source number from one or more numbers of the user of the calling party device 301. The number input and validation module 303c sets up the user account for the user with the missed call server 309 using the source number as a primary number of the user account. The number input and validation module 303c also receives the destination number from the calling party device 301. The communication mode selection module 303d detects a presence of connectivity between the calling party device 301 and a data network.

The communication mode selection module 303d selects a mode of communication with the missed call server 309 based on the presence of connectivity between the calling party device 301 and the data network. The modes of communication available comprise, for example, data communication over the data network, an interactive voice response (IVR) over a voice network, short message service (SMS) messaging through a short message service center (SMSC) 305 exemplarily illustrated in FIG. 3, and unstructured supplementary service data (USSD) commands through a USSD gateway 306 exemplarily illustrated in FIG. 3 and as disclosed in the detailed description of FIG. 3. The communication mode selection module 303d transmits the selected mode of communication to the communication module 303e. The communication module 303e communicates the request to place a missed call to the destination number along with the source number to identify an originator of the missed call, and the destination number, to the missed call server 309 of the missed call management system (MCMS) 308 through the data network or a telecommunication network via the selected mode of communication based on the detected presence of connectivity between the calling party device 301 and the data network. The communication module 303e further communicates with the contact completion application 304 implemented on the calling party device 301 exemplarily illustrated in FIG. 3, on detection of the unsuccessful attempt by the calling party device 301 to contact the called party device 314 from the source number to the destination number, for providing options to contact the called party device 314 as disclosed in the detailed description of FIG. 2. The contact attempt analysis module 303f detects an unsuccessful attempt by the calling party device 301 to contact the called party device 314 from the source number to the destination number due to an absence of credit for a voice communication, and/or a short message service communication, and/or a data communication in the calling party device 301.

In an embodiment, the missed call server application 310 comprises a missed call attempt request processing module 310a, a missed call attempt analysis and determination module 310f, a missed call placement module 310g, and a status reporting module 310h. The missed call attempt request processing module 310a processes the request for the missed call with the source number and the destination number received from the missed call client application (MCCA) 303 on the calling party device 301. The missed call attempt request processing module 310a receives the source number and the destination number from the calling party device 301 through the data network or the telecommunication network, based on the presence of connectivity between the calling party device 301 and the data network as detected by the communication mode selection module 303d of the MCCA 303 in the calling party device 301. In an embodiment, the missed call attempt request processing module 310a receives the source number and the destination number from the calling party device 301 through the telecommunication network, for example, using a voice network, and/or an unstructured supplementary service data (USSD) gateway 306, and/or a short message service center (SMSC) 305 exemplarily illustrated in FIG. 3. The missed call attempt request processing module 310a processes the request for the missed call through different modes of communication, for example, data communication over the data network, an interactive voice response (IVR) over the voice network, short message service (SMS) messaging through the SMSC 305, and USSD commands through the USSD gateway 306, using data 310b, IVR 310c, SMS 310d, and USSD 310e modules respectively. The missed call attempt analysis and determination module 310f authenticates and validates one of the numbers of the calling party device 301, in communication with the number input and validation module 303c of the missed call client application (MCCA) 303 in the calling party device 301, to obtain the source number.

The missed call attempt analysis and determination module 310f analyzes missed call attempts and determines whether a calling party associated with the calling party device 301 and/or a called party associated with the called party device 314 qualify for placement of the missed call from the source number of the calling party device 301 to the destination number of the called party device 314 and reception of the missed call respectively. The missed call attempt analysis and determination module 310f determines whether the calling party and the called party are qualified for placement and reception of the missed call respectively, based on one or more of multiple predetermined parameters comprising, for example, profiles of the calling party and the called party, time of reception of the missed call request from the missed call client application 303, time of placement of the missed call, call history, time of day, load on the missed call management system (MCMS) 308, etc. In an embodiment, the missed call server application 310 further comprises the profiling module 310i for generating profiles for the calling party and the called party using profile data as disclosed in the detailed description of FIG. 1. The missed call attempt analysis and determination module 310f determines a status and a profile of the calling party associated with the calling party device 301 as identified by the source number and a status and a profile of the called party associated with the called party device 314 as identified by the destination number to determine whether the calling party and/or the called party qualify for placement of the missed call at that point in time. The missed call attempt analysis and determination module 310f communicates with the profiling module 310i for determining the profiles of the calling party and the called party. In an embodiment, the missed call attempt analysis and determination module 310f further determines the time of day and the overall load on the MCMS 308 to determine whether the calling party and/or the called party qualify for receiving the missed call. For example, if the calling party has requested more than N number of missed calls in the last X minutes, then the calling party does not qualify to send more missed calls to avoid overuse and abuse of the missed call placement service implemented by the MCMS 308.

In another example, if a missed call has already been made from the calling party device 301 to the called party device 314 in the recent past, for example, within the last fifteen minutes, then the called party device 314 does not qualify for receiving the missed call from the same calling party device 301, when comparing an incremental value to cost. The value for placing a missed call is a callback from the called party, that is, the recipient of the missed call, to the calling party, that is, the sender of the missed call. The incremental value of placing a missed call from a calling party device 301 to a called party device 314, a short time after placing a missed call from the same calling party device 301 to the same called party device 314, is lower compared to the first missed call. If the called party device 314 did not respond to the first missed call, for example, due the called party device 314 not having sufficient balance, or the called party not being interested in calling back the calling party, the chance of the called party making a callback in response to the second missed call or subsequent missed calls made within a short time interval of the prior attempts are lower. Further, the chance of a callback by the called party that receives a repeat missed call from the same calling party is lower compared to the chances of a callback due to a missed call placed from or to a different pair of the calling party device 301 and the called party device 314. There are limited resources for placing missed calls and there is a cost for placing these missed calls. Therefore, the missed call management system (MCMS) 308 optimizes the use of these resources and limits the placement of such repeat missed calls that have a lower chance of a callback compared to other missed calls placed, thereby providing a further improvement in communication related technology related to placement of a missed call from a source number of a calling party device 301 to a destination number of a called party device 314.

In another embodiment, the missed call attempt analysis and determination module 310f determines that the calling party device 301 as identified by the source number does not qualify for placing the missed call at that time because of a high frequency of requesting missed calls to one or more destination numbers. In another embodiment, the missed call attempt analysis and determination module 310f determines that the called party device 314 as identified by the destination number does not qualify for placing the missed call at that time because of receiving a recent request from the destination number for placing a missed call indicating that the called party device 314 as identified by the destination number does not have sufficient credit to place a return call.

Figure 5:
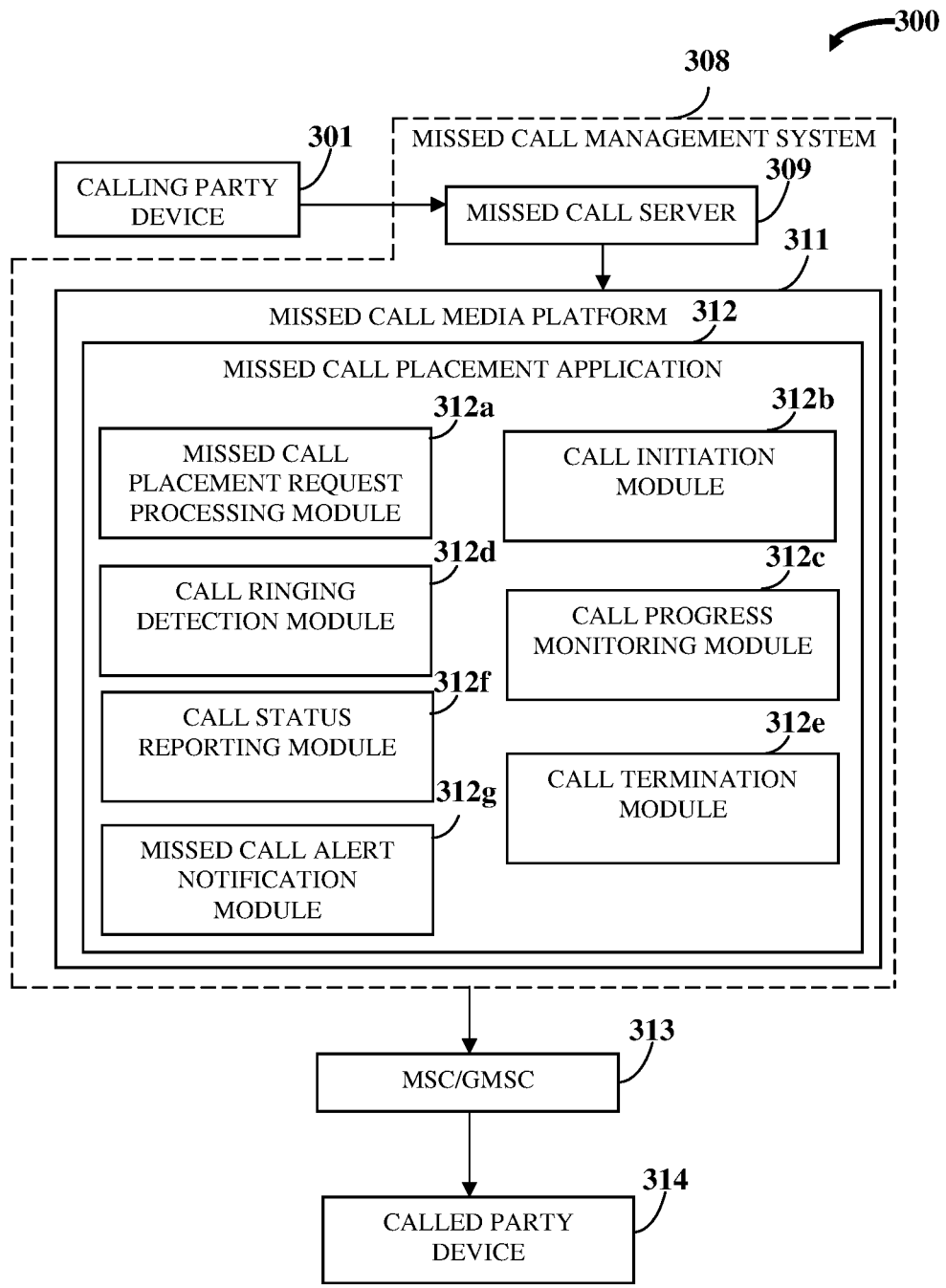
FIG. 5 exemplarily illustrates communication between the missed call server and a missed call placement application implemented on a missed call media platform of the missed call management system for placing a missed call from a source number of a calling party device to a destination number of a called party device.

The missed call placement module 310g initiates placement of the missed call from the source number to the destination number by communicating with the missed call media platform 311 exemplarily illustrated in FIG. 3 and FIG. 5. The missed call placement module 310g places a call to the destination number with an identification of an originator of the call as the source number. In an embodiment, the missed call placement module 310g sends a request to place a call to the destination number with an identification of an originator of the call as the source number to the missed call media platform 311. The status reporting module 310h reports the status of the missed call as either having successfully reached the destination number or as unsuccessful or incomplete, for example, because the called party device 314 is switched off. The status reporting module 310h sends a status of the placement of the missed call from the source number of the calling party device 301 to the destination number of the called party device 314 to the communication module 303e of the missed call client application (MCCA) 303 in the calling party device 301. The missed call server 309 communicates with the missed call media platform 311 to send a missed call alert notification, for example, as a short message service (SMS) message to the destination number indicating that the source number was trying to place a call to the destination number at a specified time.

FIG. 5 exemplarily illustrates communication between the missed call server 309 and the missed call placement application 312 implemented on the missed call media platform 311 of the missed call management system (MCMS) 308 for placing a missed call from a source number of a calling party device 301 to a destination number of a called party device 314. In an embodiment, the missed call placement application 312 comprises a missed call placement request processing module 312a, a call initiation module 312b, a call progress monitoring module 312c, a call ringing detection module 312d, a call status reporting module 312f, a call termination module 312e, and a missed call alert notification module 312g. The missed call placement request processing module 312a receives the request for placement of the missed call to the destination number from the missed call placement module 310g of the missed call server 309 exemplarily illustrated in FIG. 4, and processes the request for placement of the missed call to the destination number. The call initiation module 312b initiates a call to the destination number associated with the called party device 314 through the mobile switching center (MSC) or the gateway mobile switching center (GMSC) 313. The call progress monitoring module 312c monitors the progress of the call initiated by the call initiation module 312b to determine whether the call successfully reaches the destination number or to check whether the call is incomplete, for example, due to the called party device 314 being switched off. The call ringing detection module 312d detects a ringtone of the destination number when the call successfully reaches the destination number. The call termination module 312e terminates the call when the call successfully reaches the destination number prior to completion of the call, thereby placing the missed call from the source number of the calling party device 301 to the destination number of the called party device 314. The call status reporting module 312f reports a status of the call to the call termination module 312e to allow the call termination module 312e to terminate the call prior to completion of the call. The missed call alert notification module 312g sends a missed call alert notification to the destination number of the called party device 314 when the placement of the call to the destination number is unsuccessful.

Figure 6:
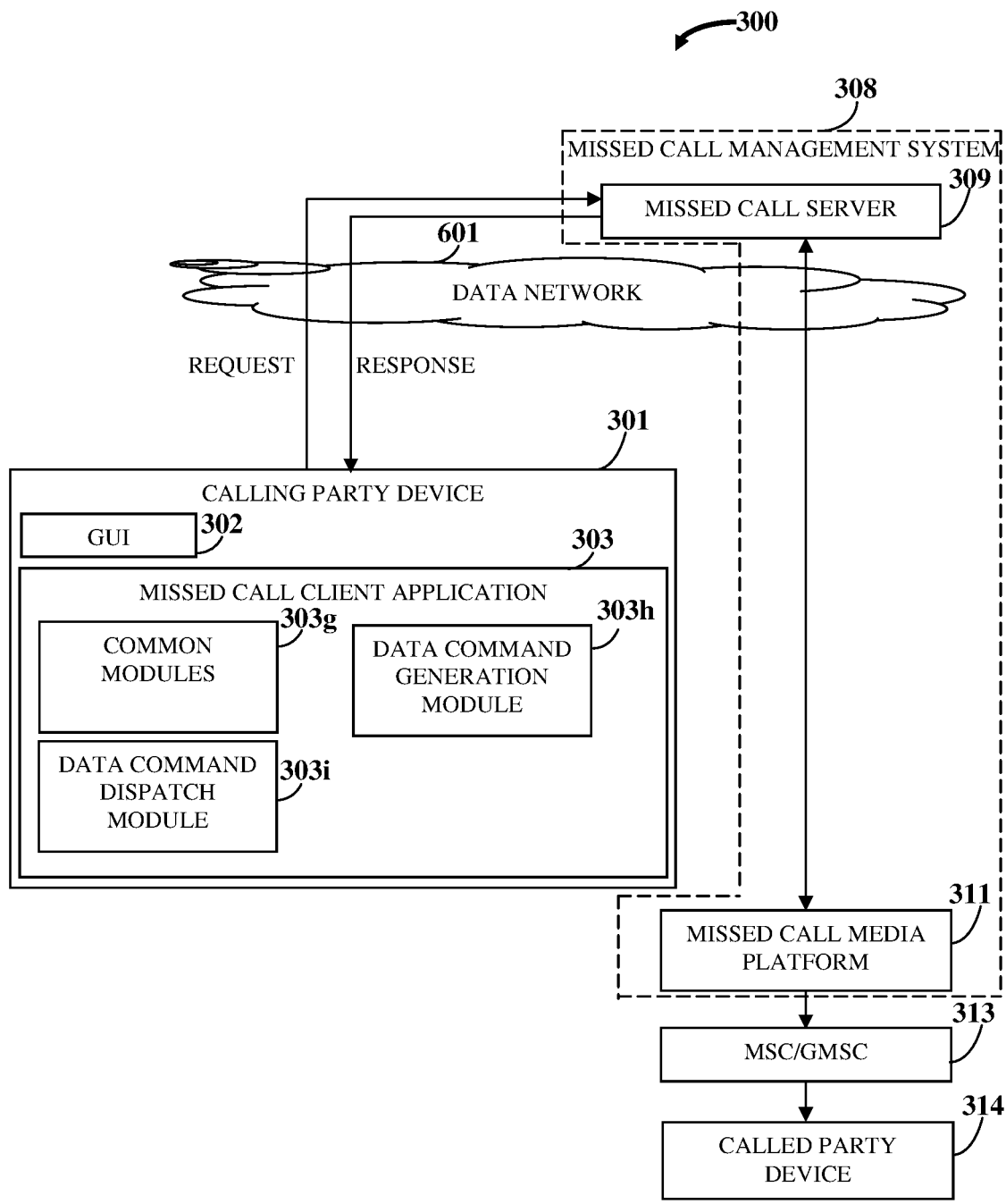
FIG. 6 exemplarily illustrates communication between a calling party device and the missed call server of the missed call management system through a data network for placing a missed call from a source number of the calling party device to a destination number of a called party device.

FIG. 6 exemplarily illustrates communication between a calling party device 301 and the missed call server 309 of the missed call management system (MCMS) 308 through a data network 601 for placing a missed call from a source number of the calling party device 301 to a destination number of a called party device 314. Common modules 303g of the missed call client application (MCCA) 303 implemented on the calling party device 301 comprise the modules of the MCCA 303 disclosed in the detailed description of FIG. 4, for example, the missed call initiation module 303a, the address book selection module 303b, the number input and validation module 303c, the communication mode selection module 303d, the communication module 303e, and the contact attempt analysis module 303f exemplarily illustrated in FIG. 4. In an embodiment, the MCCA 303 further comprises a data command generation module 303h and a data command dispatch module 303i. The data command generation module 303h generates a data command requesting the MCMS 308 to place a missed call from the source number of the calling party device 301 to the destination number of the called party device 314. The data command dispatch module 303i sends the generated data command as a request to the missed call server 309 through the data network 601. The MCCA 303 receives a response to the request for the missed call from the status reporting module 310h of the missed call server 309 exemplarily illustrated in FIG. 4, which reports the status of the missed call through the data network 601. The functions of the missed call server 309, the missed call media platform 311, and the mobile switching center (MSC) or the gateway mobile switching center (GMSC) 313 are disclosed in the detailed descriptions of FIGS. 3-5.

Figure 7:
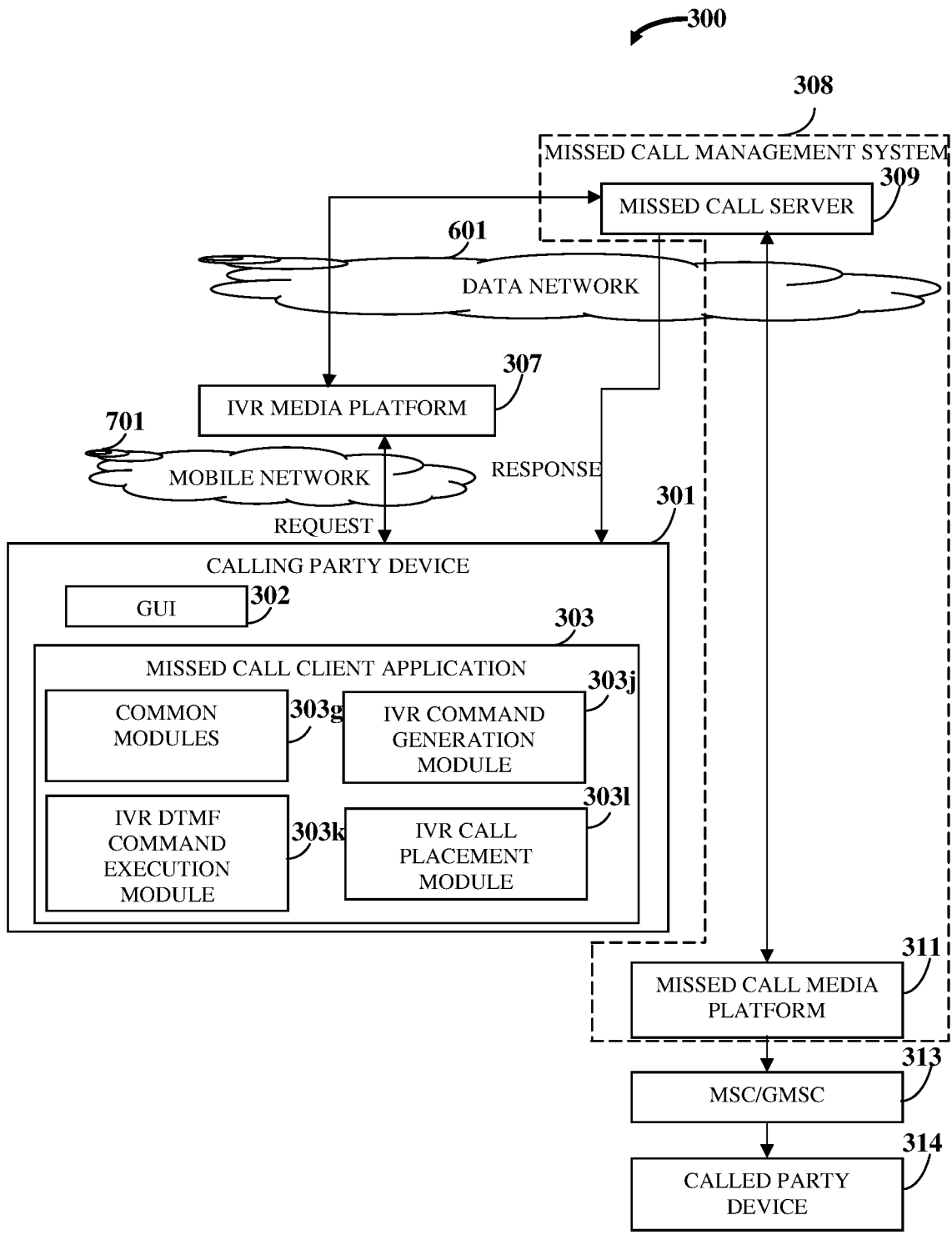
FIG. 7 exemplarily illustrates communication between a calling party device and the missed call server of the missed call management system through an interactive voice response media platform for placing a missed call from a source number of the calling party device to a destination number of a called party device.

FIG. 7 exemplarily illustrates communication between a calling party device 301 and the missed call server 309 of the missed call management system (MCMS) 308 through an interactive voice response (IVR) media platform 307 for placing a missed call from a source number of the calling party device 301 to a destination number of the called party device 314. In an embodiment, in addition to the common modules 303g, the missed call client application (MCCA) 303 further comprises an IVR command generation module 303j, an IVR dual-tone multi-frequency (DTMF) command execution module 303k, and an IVR call placement module 303l. The IVR command generation module 303j generates an IVR command to be sent to the IVR media platform 307 requesting the MCMS 308 to place a missed call from the source number of the calling party device 301 to the destination number of the called party device 314 over a telecommunication network, hereinafter exemplarily referred to as a "mobile network" 701, which is then forwarded to the missed call server 309 through the data network 601. The IVR DTMF command execution module 303k executes the generated IVR command by using DTMF commands for providing the source number and the destination number to the IVR media platform 307 for placement of the missed call. In an embodiment, the missed call server 309 reads the source number from an identification facility available in the mobile network 701 without requiring the calling party device 301 to explicitly provide the source number. The IVR call placement module 303l places an IVR call to the IVR media platform 307 for initiating a request for the placement of the missed call from the source number to the destination number. The communication between the IVR media platform 307 and the calling party device 301 is a two-way communication as the communication for sending the IVR command as a request for placement of the missed call by the MCCA 303 to the MCMS 308 is carried out interactively between the calling party device 301 and the IVR media platform 307 over the mobile network 701. The MCCA 303 receives a response to the request for the missed call from the status reporting module 310h of the missed call server 309 exemplarily illustrated in FIG. 4. The functions of the missed call server 309, the missed call media platform 311, and the mobile switching center (MSC) or the gateway mobile switching center (GMSC) 313 are disclosed in the detailed descriptions of FIGS. 3-5.

Figure 8:
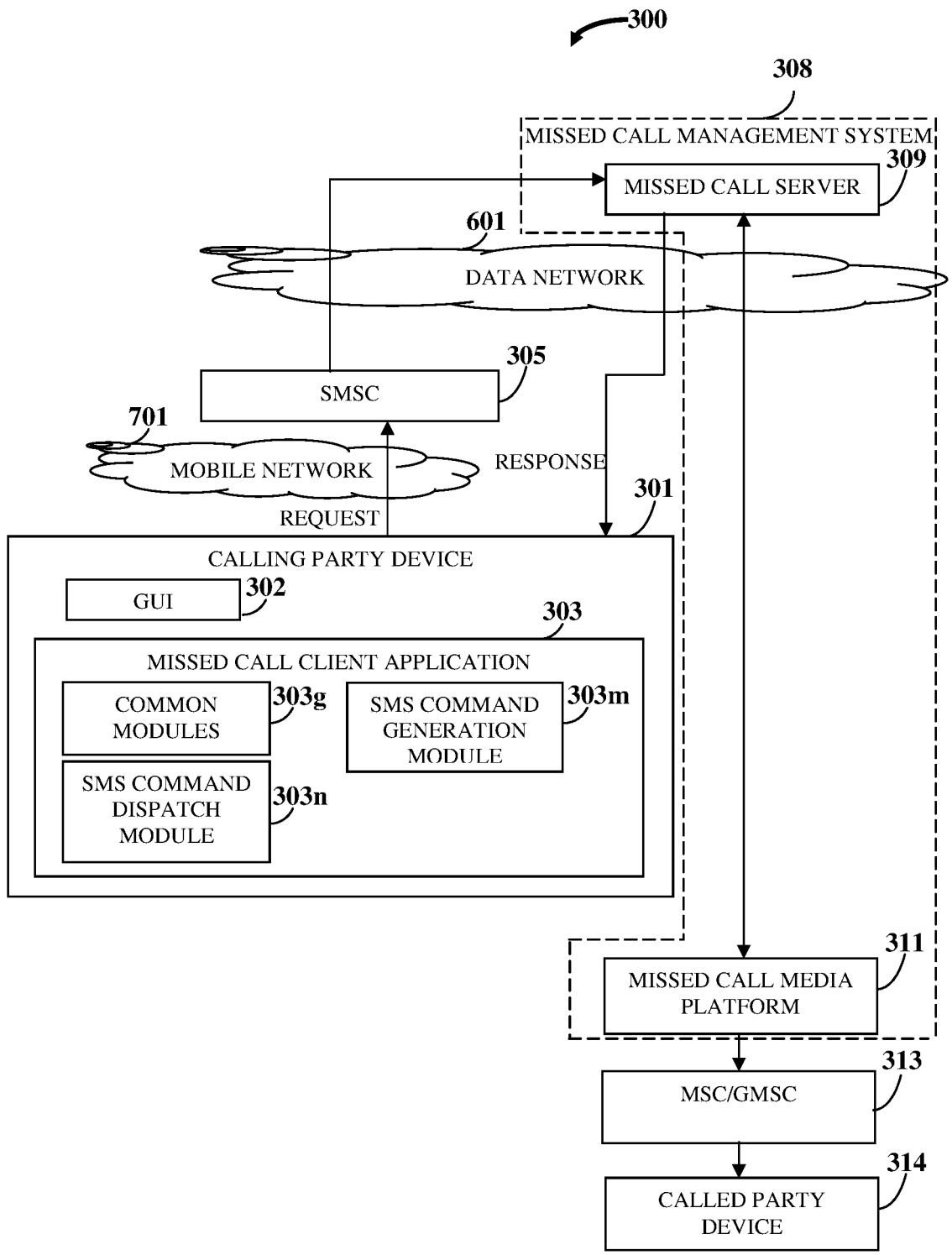
FIG. 8 exemplarily illustrates communication between a calling party device and the missed call server of the missed call management system through a short message service center for placing a missed call from a source number of the calling party device to a destination number of a called party device.

FIG. 8 exemplarily illustrates communication between a calling party device 301 and the missed call server 309 of the missed call management system (MCMS) 308 through a short message service center (SMSC) 305 for placing a missed call from a source number of the calling party device 301 to a destination number of a called party device 314. In an embodiment, in addition to the common modules 303g, the MCCA 303 further comprises a short message service (SMS) command generation module 303m and an SMS command dispatch module 303n. The SMS command generation module 303m generates an SMS command requesting the MCMS 308 to place a missed call from the source number of the calling party device 301 to the destination number of the called party device 314. The SMS command dispatch module 303n sends the generated SMS command as a request to the SMSC 305 through the mobile network 701, which is then forwarded to the missed call server 309 through the data network 601. The missed call server 309 sends a response to the missed call request to the MCCA 303 on the calling party device 301 as disclosed in the detailed description of FIG. 6. The functions of the missed call server 309, the missed call media platform 311, and the mobile switching center (MSC) or the gateway mobile switching center (GMSC) 313 are as disclosed in the detailed descriptions of FIGS. 3-5.

Figure 9:
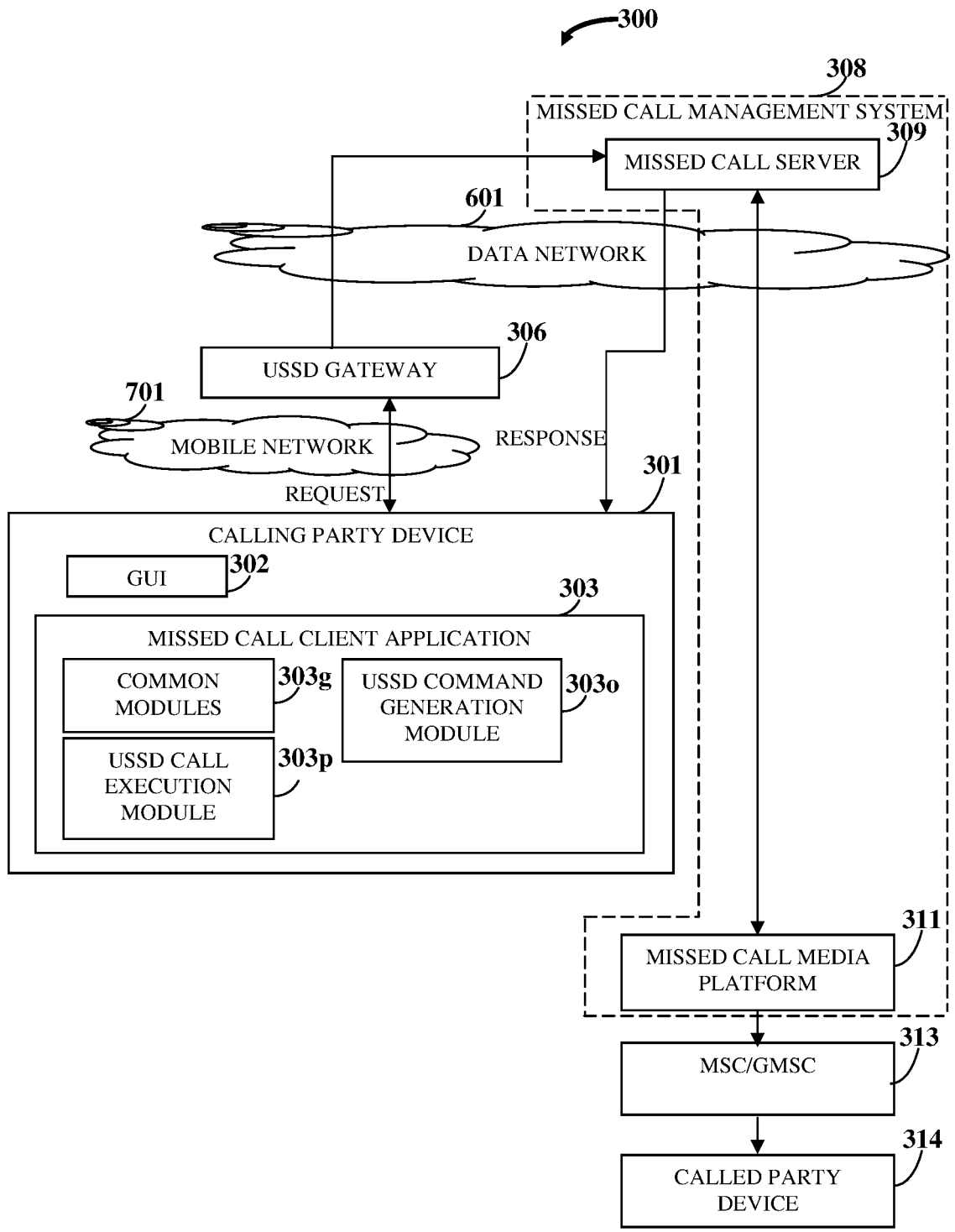
FIG. 9 exemplarily illustrates communication between a calling party device and the missed call server of the missed call management system through an unstructured supplementary service data gateway for placing a missed call from a source number of the calling party device to a destination number of a called party device.

FIG. 9 exemplarily illustrates communication between a calling party device 301 and the missed call server 309 of the missed call management system (MCMS) 308 through an unstructured supplementary service data (USSD) gateway 306 for placing a missed call from a source number of the calling party device 301 to a destination number of a called party device 314. In an embodiment, in addition to the common modules 303g, the missed call client application (MCCA) 303 further comprises a USSD command generation module 303o and a USSD call execution module 303p. The USSD command generation module 303o generates a USSD command requesting the MCMS 308 to place a missed call from the source number of the calling party device 301 to the destination number of the called party device 314. The USSD call execution module 303p sends the generated USSD command as a request to the USSD gateway 306 through the mobile network 701, which is then forwarded to the missed call server 309 through the data network 601. The communication between the USSD gateway 306 and the calling party device 301 is a two-way communication as the communication for sending the USSD command as a request for placement of the missed call by the MCCA 303 to the MCMS 308 is carried out interactively between the calling party device 301 and the USSD gateway 306 over the mobile network 701 using the USSD command. The missed call server 309 sends a response to the missed call request to the MCCA 303 on the calling party device 301 as disclosed in the detailed description of FIG. 6. The functions of the missed call server 309, the missed call media platform 311, and the mobile switching center (MSC) or the gateway mobile switching center (GMSC) 313 are disclosed in the detailed descriptions of FIGS. 3-5.

Figure 10:
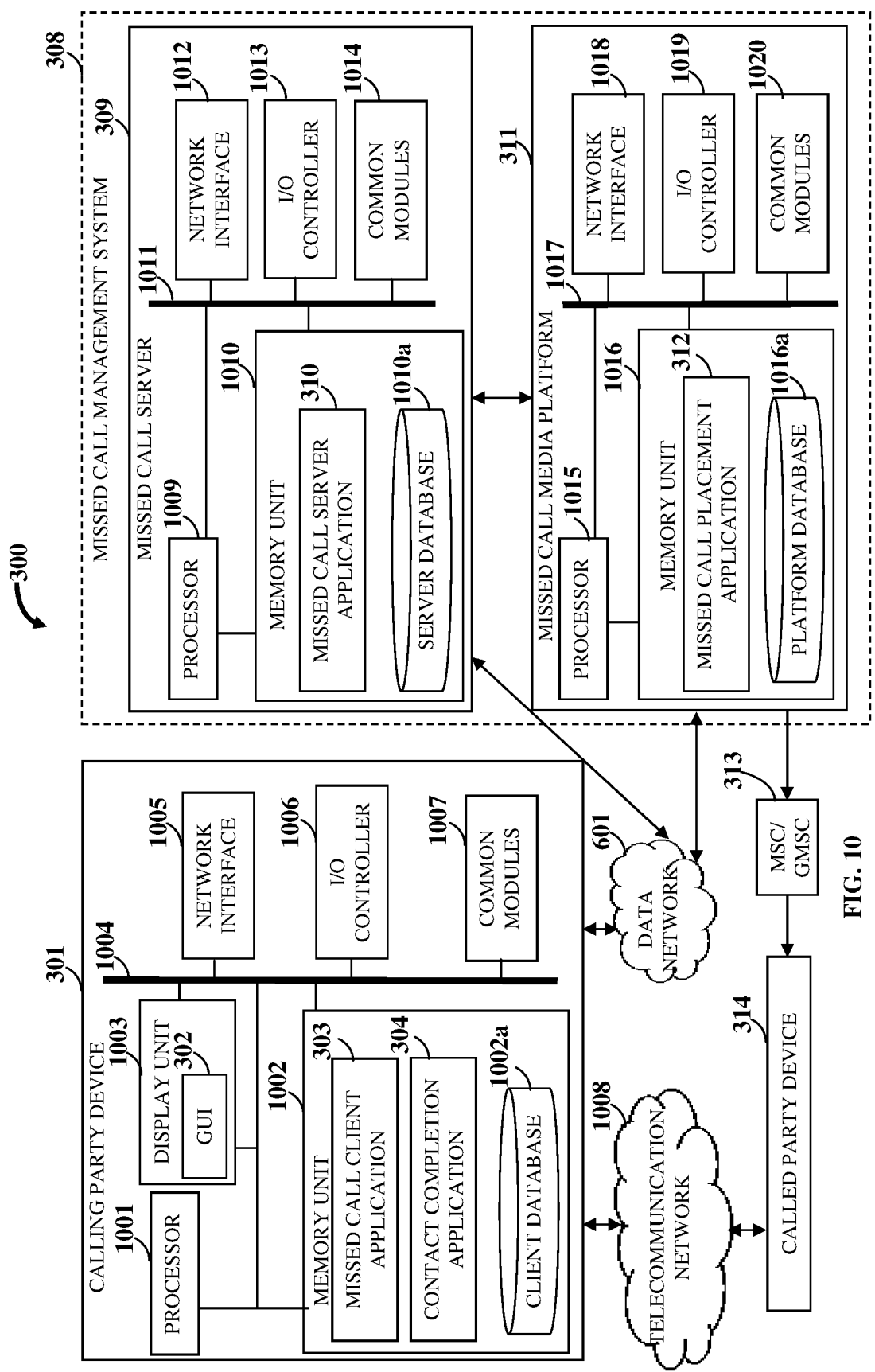
FIG. 10 exemplarily illustrates an architectural diagram of the system for placing a missed call from a source number of a calling party device to a destination number of a called party device.

FIG. 10 exemplarily illustrates an architectural diagram of the system 300 for placing a missed call from a source number of a calling party device 301 to a destination number of a called party device 314. The system 300 disclosed herein comprises the missed call client application (MCCA) 303 installed on the calling party device 301 in communication with the missed call management system (MCMS) 308 via a data network 601, for example, a short range network or a long range network. The calling party device 301 communicates with the called party device 314 via a telecommunication network 1008 and/or the data network 601. The calling party device 301 and the called party device 314 are user devices as disclosed in the detailed description of FIG. 1. In an embodiment, the calling party device 301 and the called party device 314 are hybrid computing devices that combine the functionality of multiple devices. Examples of hybrid computing devices comprise a cellular telephone that includes a media player functionality, a gaming device that includes a wireless communications capability, a cellular telephone that includes game and multimedia functions, and a portable device that receives electronic mail (email), supports mobile telephone calls, has a media player functionality, and supports web browsing. The MCMS 308 is accessible to users, for example, through a broad spectrum of technologies and devices such as personal computers with access to the internet, internet enabled cellular phones, tablet computing devices, etc. The MCMS 308 comprises the missed call server 309 and the missed call media platform 311 as disclosed in the detailed descriptions of FIGS. 3-5.

The calling party device 301, the missed call server 309, and the missed call media platform 311 are computer systems that are programmable using high level computer programming languages. In an embodiment, the missed call client application (MCCA) 303 and the contact completion application 304 are implemented on the calling party device 301 using programmed and purposeful hardware. Similarly, the missed call server application 310 is implemented on the missed call server 309, and the missed call placement application 312 is implemented on the missed call media platform 311 using programmed and purposeful hardware. As exemplarily illustrated in FIG. 10, the calling party device 301, the missed call server 309, and the missed call media platform 311 comprise non-transitory computer readable storage media, for example, memory units 1002, 1010, and 1016 respectively, for storing program instructions, applications, and data. As used herein, "non-transitory computer readable storage media" refers to all computer readable media, for example, non-volatile media, volatile media, and transmission media, except for a transitory, propagating signal. Non-volatile media comprise, for example, solid state drives, optical discs or magnetic disks, and other persistent memory volatile media including a dynamic random access memory (DRAM), which typically constitute a main memory. Volatile media comprise, for example, a register memory, a processor cache, a random access memory (RAM), etc. Transmission media comprise, for example, coaxial cables, copper wires, fiber optic cables, modems, etc., including wires that constitute a system bus coupled to a processor, for example, 1001, or 1009, or 1015.

The missed call client application 303, the contact completion application 304, and a client database 1002a of the calling party device 301 are installed and stored in the memory unit 1002 of the calling party device 301. The missed call server application 310 and a server database 1010a are installed and stored in the memory unit 1010 of the missed call server 309. The missed call placement application 312 and a platform database 1016a are installed and stored in the memory unit 1016 of the missed call media platform 311. The memory unit 1002 of the calling party device 301 stores computer program instructions defined by modules, for example, 303, 304, 1002a, etc., of the calling party device 301. Similarly, the memory unit 1010 of the missed call server 309 stores computer program instructions defined by modules, for example, 310, 1010a, etc., of the missed call server 309, and the memory unit 1016 of the missed call media platform 311 stores computer program instructions defined by modules, for example, 312, 1016a, etc., of the missed call media platform 311. The memory units 1002, 1010, and 1016 of the calling party device 301, the missed call server 309, and the missed call media platform 311 respectively are, for example, random access memories (RAMs) or other types of dynamic storage devices that store information and instructions for execution by the processors 1001, 1009, and 1015 of the calling party device 301, the missed call server 309, and the missed call media platform 311 respectively. The memory units 1002, 1010, and 1016 also store temporary variables and other intermediate information used during execution of the instructions by the processors 1001, 1009, and 1015 respectively. The calling party device 301, the missed call server 309, and the missed call media platform 311, each further comprises a read only memory (ROM) or another type of static storage device that stores static information and instructions for the processors 1001, 1009, and 1015 respectively.

The processors 1001, 1009, and 1015 are communicatively coupled to the memory units 1002, 1010, and 1016 of the calling party device 301, the missed call server 309, and the missed call media platform 311 respectively. The processor 1001 of the calling party device 301 executes computer program instructions defined by the missed call client application 303 and the contact completion application 304 of the calling party device 301. The processor 1009 of the missed call server 309 executes computer program instructions defined by the missed call server application 310 of the missed call server 309. The processor 1015 of the missed call media platform 311 executes computer program instructions defined by the missed call placement application 312 of the missed call media platform 311. The processors 1001, 1009, and 1015 of the calling party device 301, the missed call server 309, and the missed call media platform 311 respectively, refer to any one or more microprocessors, central processing unit (CPU) devices, finite state machines, computers, microcontrollers, digital signal processors, logic, a logic device, an user circuit, an application specific integrated circuit (ASIC), a field-programmable gate array (FPGA), a chip, etc., or any combination thereof, capable of executing computer programs or a series of commands, instructions, or state transitions. In an embodiment, each of the processors 1001, 1009, and 1015 is implemented as a processor set comprising, for example, a programmed microprocessor and a math or graphics co-processor. The processor 1001, 1009, and 1015 are selected, for example, from the Intel® processors such as the Itanium® microprocessor or the Pentium® processors, Advanced Micro Devices (AMD®) processors such as the Athlon® processor, UltraSPARC® processors, microSPARC® processors, HP® processors, International Business Machines (IBM®) processors such as the PowerPC® microprocessor, the MIPS® reduced instruction set computer (RISC) processor of MIPS Technologies, Inc., RISC based computer processors of ARM Holdings, Motorola® processors, Qualcomm® processors, etc. The system 300 disclosed herein is not limited to employing the processors 1001, 1009, and 1015. In an embodiment, the system 300 employs controllers or microcontrollers.

As exemplarily illustrated in FIG. 10, the calling party device 301, the missed call server 309, and the missed call media platform 311 further comprise data buses 1004, 1011, and 1017, network interfaces 1005, 1012, and 1018, input/output (I/O) controllers 1006, 1013, and 1019, and common modules 1007, 1014, and 1020 respectively, where the common modules 1007, 1014, and 1020 comprise input devices, output devices, fixed media drives such as hard drives, removable media drives for receiving removable media, etc. The data bus 1004 of the calling party device 301 permits communication between the modules, for example, 1001, 1002, 1003, 1005, 1006, 1007, etc., of the calling party device 301. The data bus 1011 of the missed call server 309 permits communication between the modules, for example, 1009, 1010, 1012, 1013, 1014, etc., of the missed call server 309. The data bus 1017 of the missed call media platform 311 permits communication between the modules, for example, 1015, 1016, 1018, 1019, 1020, etc., of the missed call media platform 311. The network interfaces 1005, 1012, and 1018 enable connection of the calling party device 301, the missed call server 309, and the missed call media platform 311 respectively, to the data network 601 and the telecommunication network 1008. In an embodiment, the network interfaces 1005, 1012, and 1018 of the calling party device 301, the missed call server 309, and the missed call media platform 311 respectively, are provided as interface cards also referred to as line cards. The network interfaces 1005, 1012, and 1018 are, for example, one or more of infrared (IR) interfaces, interfaces implementing Wi-Fi® of Wi-Fi Alliance Corporation, universal serial bus (USB) interfaces, FireWire® interfaces of Apple Inc., Ethernet interfaces, frame relay interfaces, cable interfaces, digital subscriber line (DSL) interfaces, token ring interfaces, peripheral controller interconnect (PCI) interfaces, local area network (LAN) interfaces, wide area network (WAN) interfaces, interfaces using serial protocols, interfaces using parallel protocols, Ethernet communication interfaces, asynchronous transfer mode (ATM) interfaces, high speed serial interfaces (HSSIs), fiber distributed data interfaces (FDDIs), interfaces based on transmission control protocol (TCP)/internet protocol (IP), interfaces based on wireless communications technology such as satellite technology, radio frequency (RF) technology, near field communication, etc. The I/O controllers 1006, 1013, and 1019 of the calling party device 301, the missed call server 309, and the missed call media platform 311 control input actions and output actions performed by the calling party device 301, the missed call server 309, and the missed call media platform 311 respectively.

In an embodiment, the calling party device 301 further comprises a display unit 1003 that displays the graphical user interface (GUI) 302 rendered by the missed call client application (MCCA) 303 and the contact completion application 304. The display unit 1003 is, for example, a video display, a liquid crystal display, a plasma display, an organic light emitting diode (OLED) based display, etc. The display unit 1003, via the GUI 302, displays information, displays interfaces, user interface elements such as swipable arrows, icons, search boxes, etc., for example, for selecting the destination number on the calling party device 301 to place the missed call, for selecting one of the options to contact the called party device 314 on detection of an unsuccessful attempt by the calling party device 301 to contact the called party device 314, etc. The MCCA 303 renders the GUI 302 on the display unit 1003 to receive user inputs, for example, a selection of the source number and the destination number, a selection of one of the options to contact the called party device 314, etc. The GUI 302 is, for example, an online web interface, a web based downloadable application interface, a mobile based downloadable application interface, etc.

The client database 1002a in the calling party device 301, the server database 1010a in the missed call server 309, and the platform database 1016a in the missed call media platform 311 can be any storage area or medium that can be used for storing the source number, the destination number, and the profile data of the calling party and the called party. In an embodiment, the client database 1002a, the server database 1010a, and the platform database 1016a are external databases, for example, a structured query language (SQL) data store or a not only SQL (NoSQL) data store such as the Microsoft® SQL Server®, the Oracle® servers, the MySQL® database of MySQL AB Company, the mongoDB® of MongoDB, Inc., the Neo4j graph database of Neo Technology Corporation, the Cassandra database of the Apache Software Foundation, the HBase® database of the Apache Software Foundation, etc. In an embodiment, the client database 1002a, the server database 1010a, and the platform database 1016a can also be locations on respective file systems of the calling party device 301, the missed call server 309, and the missed call media platform 311 respectively. In another embodiment, the client database 1002a, the server database 1010a, and the platform database 1016a can be remotely accessed by the calling party device 301, the missed call server 309, and the missed call media platform 311 respectively, via the data network 601. In another embodiment, the client database 1002a, the server database 1010a, and the platform database 1016a are configured as cloud based databases implemented in a cloud computing environment, where computing resources are delivered as a service over the data network 601. As used herein, "cloud computing environment" refers to a processing environment comprising configurable computing physical and logical resources, for example, networks, servers, storage media, virtual machines, applications, services, etc., and data distributed over a network, for example, the internet. The cloud computing environment provides on-demand network access to a shared pool of the configurable computing physical and logical resources.

Computer applications and programs are used for operating the missed call client application (MCCA) 303 on the calling party device 301, the missed call server application 310 on the missed call server 309, and the missed call placement application 312 on the missed call media platform 311. The programs are loaded onto the fixed media drives and into the memory units 1002, 1010, and 1016 of the calling party device 301, the missed call server 309, and the missed call media platform 311 respectively, via the respective removable media drives. In an embodiment, the computer applications and programs are loaded directly into the memory units 1002, 1010, and 1016 of the calling party device 301, the missed call server 309, and the missed call media platform 311 respectively, via the data network 601.

Each of the processors 1001, 1009, and 1015 of the calling party device 301, the missed call server 309, and the missed call media platform 311 respectively, executes an operating system, for example, the Linux® operating system, the Unix® operating system, any version of the Microsoft® Windows® operating system, the Mac OS of Apple Inc., the IBM® OS/2, VxWorks® of Wind River Systems, Inc., QNX Neutrino® developed by QNX Software Systems Ltd., the Palm OS®, the Solaris operating system developed by Sun Microsystems, Inc., etc. The calling party device 301, the missed call server 309, and the missed call media platform 311 employ their respective operating systems for performing multiple tasks. The operating systems of the calling party device 301, the missed call server 309, and the missed call media platform 311 are responsible for management and coordination of activities and sharing of their respective resources. The operating systems further manage security, peripheral devices, and network connections. The operating systems recognize, for example, inputs provided by a user, files, and directories stored locally on the respective fixed media drives. The operating systems of the calling party device 301, the missed call server 309, and the missed call media platform 311 execute different programs using the processors 1001, 1009, and 1015 respectively. The processors 1001, 1009, and 1015 and the operating systems of the calling party device 301, the missed call server 309, and the missed call media platform 311 respectively, together define a computer platform for which application programs in high level programming languages are written.

The processor 1001 of the calling party device 301 retrieves instructions defined by the missed call initiation module 303*a*, the address book selection module 303*b*, the number input and validation module 303*c*, the communication mode selection module 303*d*, the communication module 303*e*, and the contact attempt analysis module 303*f* of the missed call client application 303 exemplarily illustrated in FIG. 4, the data command generation module 303*h* and the data command dispatch module 303*i* exemplarily illustrated in FIG. 6, the interactive voice response (IVR) command generation module 303*j*, the IVR dual-tone multi-frequency (DTMF) command execution module 303*k*, and the IVR call placement module 303*l* exemplarily illustrated in FIG. 7, the short message service (SMS) command generation module 303*m* and the SMS command dispatch module 303*n* exemplarily illustrated in FIG. 8, the unstructured supplementary service data (USSD) command generation module 303*o* and the USSD call execution module 303*p* exemplarily illustrated in FIG. 9, in the memory unit 1002 of the calling party device 301, for performing respective functions disclosed in the detailed description of FIG. 4. The processor 1001 of the calling party device 301 also retrieves instructions defined by the contact completion application 304 in the memory unit 1002 of the calling party device 301 for performing functions of the contact completion application 304 disclosed in the detailed description of FIG. 2. The processor 1001 of the calling party device 301 retrieves instructions for executing the modules 303*a*, 303*b*, 303*c*, 303*d*, 303*e*, 303*f*, 303*h*, 303*i*, 303*j*, 303*k*, 303*l*, 303*m*, 303*n*, 303*o*, 303*p*, etc., of the missed call client application 303 and the contact completion application 304. The processor 1009 of the missed call server 309 retrieves instructions defined by the missed call attempt request processing module 310*a*, the missed call attempt analysis and determination module 310*f*, the missed call placement module 310*g*, the status reporting module 310*h*, and the profiling module 310*i* of the missed call server application 310 exemplarily illustrated in FIG. 4, in the memory unit 1010 of the missed call server 309, for performing respective functions disclosed in the detailed description of FIG. 4. The processor 1009 of the missed call server 309 retrieves instructions for executing the modules 310*a*, 310*f*, 310*g*, 310*h*, 310*i*, etc., of the missed call server application 310. The processor 1015 of the missed call media platform 311 retrieves instructions defined by the missed call placement request processing module 312*a*, the call initiation module 312*b*, the call progress monitoring module 312*c*, the call ringing detection module 312*d*, the call termination module 312*e*, the call status reporting module 312*f*, and the missed call alert notification module 312*g* of the missed call placement application 312 exemplarily illustrated in FIG. 5, in the memory unit 1016 of the missed call media platform 311 for performing respective functions disclosed in the detailed description of FIG. 5. The processor 1015 of the missed call media platform 311 retrieves instructions for executing the modules 312*a*, 312*b*, 312*c*, 312*d*, 312*e*, 312*f*, 312*g*, etc., of the missed call media platform 311.

A program counter determines the location of the instructions in each of the memory units 1002, 1010, and 1016. The program counter stores a number that identifies the current position in the program of each of the modules, for example 303*a*, 303*b*, 303*c*, 303*d*, 303*e*, 303*f*, 303*h*, 303*i*, 303*j*, 303*k*, 303*l*, 303*m*, 303*n*, 303*o*, 303*p*, etc., of the calling party device 301, the modules, for example, 310*a*, 310*f*, 310*g*, 310*h*, 310*i*, etc., of the missed call server 309, and the modules, for example 312*a*, 312*b*, 312*c*, 312*d*, 312*e*, 312*f*, 312*g*, etc., of the missed call media platform 311 respectively. The instructions fetched by the processors 1001, 1009, and 1015 from the memory units 1002, 1010, and 1016 respectively, after being processed are decoded. The instructions are stored in an instruction register in each of the processors 1001, 1009, and 1015. After processing and decoding, the processors 1001, 1009, and 1015 execute the instructions, thereby performing one or more processes defined by those instructions.

At the time of execution, the instructions stored in the instruction register are examined to determine the operations to be performed. The processors 1001, 1009, and 1015 of the calling party device 301, the missed call server 309, and the missed call media platform 311 respectively, then perform the specified operations. The operations comprise arithmetic operations and logic operations. The respective operating systems perform multiple routines for performing a number of tasks required to assign the memory units 1002, 1010, and 1016 for execution of the modules, for example, 303*a*, 303*b*, 303*c*, 303*d*, 303*e*, 303*f*, 303*h*, 303*i*, 303*j*, 303*k*, 303*l*, 303*m*, 303*n*, 303*o*, 303*p*, etc., on the calling party device 301, the modules, for example, 310*a*, 310*f*, 310*g*, 310*h*, 310*i*, etc., on the missed call server 309, and the modules, for example, 312*a*, 312*b*, 312*c*, 312*d*, 312*e*, 312*f*, 312*g*, etc., on the missed call media platform 311 respectively. The tasks performed by the respective operating systems comprise, for example, assigning memory to the modules, for example, 303*a*, 303*b*, 303*c*, 303*d*, 303*e*, 303*f*, 303*h*, 303*i*, 303*j*, 303*k*, 303*l*, 303*m*, 303*n*, 303*o*, 303*p*, etc., on the calling party device 301, the modules, for example, 310*a*, 310*f*, 310*g*, 310*h*, 310*i*, etc., on the missed call server 309, and the modules, for example, 312*a*, 312*b*, 312*c*, 312*d*, 312*e*, 312*f*, 312*g*, etc., on the missed call media platform 311 respectively, and to data used by the calling party device 301, the missed call server 309, and the missed call media platform 311 respectively, moving data between the memory units 1002, 1010, and 1016 and disk units, and handling input/output operations. The respective operating systems perform the tasks on request by the operations and after performing the tasks, the respective operating systems transfer the execution control back to the processors 1001, 1009, and 1015. The processors 1001, 1009, and 1015 continue the execution to obtain one or more outputs. The outputs of the execution of the modules, for example, 303a, 303b, 303c, 303d, 303e, 303f, 303h, 303i, 303j, 303k, 303l, 303m, 303n, 303o, 303p, etc., on the calling party device 301, the modules, for example, 310a, 310f, 310g, 310h, 310i, etc., on the missed call server 309, and the modules, for example, 312a, 312b, 312c, 312d, 312e, 312f, 312g, etc., on the missed call media platform 311 respectively, are displayed to the user on the graphical user interface (GUI) 302 of the calling party device 301.

For purposes of illustration, the detailed description refers to the calling party device 301, the missed call server 309, and the missed call media platform 311 being run locally as individual computer systems; however the scope of the method and the system 300 disclosed herein is not limited to the calling party device 301, the missed call server 309, and the missed call media platform 311 being run locally on individual computer systems via their respective operating systems and processors 1001, 1009, and 1015, but may be extended to run remotely over the data network 601 by employing web browsers and remote servers, mobile phones, or other electronic devices. In an embodiment, one or more portions of the system 300 disclosed herein are distributed across one or more computer systems (not shown) coupled to the data network 601. Furthermore, although the detailed descriptions of FIGS. 3-10 relate to an implementation of the missed call management system (MCMS) 308 comprising the missed call server 309 and the missed call media platform 311, the MCMS 308 is not limited to be implemented using the missed call server 309 and the missed call media platform 311, but may be extended to be implemented using a single server or a network of two or more servers and computer systems.

The non-transitory computer readable storage media disclosed herein stores computer program codes comprising instructions executable by the processors 1001, 1009, and 1015 for placing the missed call from the source number of the calling party device 301 to the destination number of the called party device 314. In the non-transitory computer readable storage media of the missed call management system (MCMS) 308, the computer program codes comprise a first computer program code for receiving the source number and the destination number from the calling party device 301 through the data network 601 or the telecommunication network 1008 based on a presence of connectivity between the calling party device 301 and the data network 601 as detected by the missed call client application 303 implemented on the calling party device 301; a second computer program code for placing a call to the destination number with an identification of an originator of the call as the source number; and a third computer program code for terminating the call when the call successfully reaches the destination number prior to completion of the call, thereby placing the missed call from the source number of the calling party device 301 to the destination number of the called party device 314.

In an embodiment, the computer program codes further comprise a fourth computer program code for determining whether the calling party associated with the calling party device 301 and the called party associated with the called party device 314 are qualified for the placement of the missed call from the source number of the calling party device 301 to the destination number of the called party device 314 based on one or more of multiple predetermined parameters comprising, for example, time of reception of the missed call request from the missed call client application (MCCA) 303, time of placement of the missed call, call history, profiles of the calling party and the called party, time of day, load on the missed call management system 308, etc. In another embodiment, the computer program codes further comprise a fifth computer program code for sending a status of the placement of the missed call from the source number of the calling party device 301 to the destination number of the called party device 314 to the MCCA 303 implemented on the calling party device 301. In another embodiment, the computer program codes further comprise a sixth computer program code for authenticating and validating one of the numbers, in communication with the MCCA 303 implemented on the calling party device 301, to obtain the source number. In another embodiment, the computer program codes further comprise a seventh computer program code for sending a missed call alert notification to the destination number of the called party device 314 when the placement of the call to the destination number is unsuccessful.

The computer program codes further comprise one or more additional computer program codes for performing additional steps that may be required and contemplated for placing a missed call from a source number of a calling party device 301 to a destination number of a called party device 314. In an embodiment, a single piece of computer program code comprising computer executable instructions performs one or more steps of the method disclosed herein for placing a missed call from a source number of a calling party device 301 to a destination number of a called party device 314. The computer program codes comprising computer executable instructions are embodied on the non-transitory computer readable storage media. The processors 1009 and 1015 of the missed call server 309 and the missed call media platform 311 respectively, retrieve their respective computer executable instructions and execute them. When the computer executable instructions are executed by the processors 1009 and 1015, the computer executable instructions cause the processors 1009 and 1015 to perform the steps of the method for placing a missed call from a source number of a calling party device 301 to a destination number of a called party device 314.

It will be readily apparent in different embodiments that the various methods, algorithms, and computer programs disclosed herein are implemented on non-transitory computer readable storage media appropriately programmed for computing devices. The non-transitory computer readable storage media participates in providing data, for example, instructions that are read by a computer, a processor or a similar device. In different embodiments, the "non-transitory computer readable storage media" further refers to a single medium or multiple media, for example, a centralized database, a distributed database, and/or associated caches and servers that store one or more sets of instructions that are read by a computer, a processor or a similar device. The "non-transitory computer readable storage media" further refers to any medium capable of storing or encoding a set of instructions for execution by a computer, a processor or a similar device and that causes a computer, a processor or a similar device to perform any one or more of the methods disclosed herein. Common forms of non-transitory computer readable storage media comprise, for example, a floppy disk, a flexible disk, a hard disk, magnetic tape, a laser disc, a Blu-ray Disc® of the Blu-ray Disc Association, any magnetic medium, a compact disc-read only memory (CD-ROM), a digital versatile disc (DVD), any optical medium, a flash memory card, punch cards, paper tape, any other physical medium with patterns of holes, a random access memory (RAM), a programmable read only memory (PROM), an erasable programmable read only memory (EPROM), an electrically erasable programmable read only memory (EEPROM), a flash memory, any other memory chip or cartridge, or any other medium from which a computer can read.

In an embodiment, the computer programs that implement the methods and algorithms disclosed herein are stored and transmitted using a variety of media, for example, the computer readable media in a number of manners. In an embodiment, hard-wired circuitry or custom hardware is used in place of, or in combination with, software instructions for implementing the processes of various embodiments. Therefore, the embodiments are not limited to any specific combination of hardware and software. The computer program codes comprising computer executable instructions can be implemented in any programming language. Examples of programming languages that can be used in the method disclosed herein are C, C++, C#, Java®, JavaScript®, Fortran, Ruby, Perl®, Python®, Visual Basic®, hypertext preprocessor (PHP), Microsoft®.NET, Objective-C®, the Swift™ programming language of Apple Inc., etc. Other object-oriented, functional, scripting, and/or logical programming languages can also be used. In an embodiment, the computer program codes or software programs are stored on or in one or more mediums as object code. In another embodiment, various aspects of the method and the system 300 exemplarily illustrated in FIG. 3 and FIGS. 5-10, disclosed herein are implemented in a non-programmed environment comprising documents created, for example, in a hypertext markup language (HTML), an extensible markup language (XML), or other format that render aspects of the graphical user interface (GUI) 302 exemplarily illustrated in FIGS. 3-4 and FIGS. 6-10, or perform other functions, when viewed in a visual area or a window of a browser program. In another embodiment, various aspects of the method and the system 300 disclosed herein are implemented as programmed elements, or non-programmed elements, or any suitable combination thereof.

Where databases are described such as the client database 1002a, the server database 1010a, and the platform database 1016a exemplarily illustrated in FIG. 10, it will be understood by one of ordinary skill in the art that (i) alternative database structures to those described may be employed, and (ii) other memory structures besides databases may be employed. Any illustrations or descriptions of any sample databases disclosed herein are illustrative arrangements for stored representations of information. In an embodiment, any number of other arrangements are employed besides those suggested by tables illustrated in the drawings or elsewhere. Similarly, any illustrated entries of the databases represent exemplary information only; one of ordinary skill in the art will understand that the number and content of the entries can be different from those disclosed herein. In another embodiment, despite any depiction of the databases as tables, other formats including relational databases, object-based models, and/or distributed databases are used to store and manipulate the data types disclosed herein. Object methods or behaviors of a database can be used to implement various processes such as those disclosed herein. In another embodiment, the databases are, in a known manner, stored locally or remotely from a device that accesses data in such a database. In embodiments where there are multiple databases in the system 300, the databases are integrated to communicate with each other for enabling simultaneous updates of data linked across the databases, when there are any updates to the data in one of the databases.

The method and the system 300 disclosed herein can be configured to work in a network environment comprising one or more computers that are in communication with one or more devices via the data network 601 exemplarily illustrated in FIGS. 6-10. In an embodiment, the computers communicate with the devices directly or indirectly, via a wired medium or a wireless medium such as the Internet, a local area network (LAN), a wide area network (WAN) or the Ethernet, a token ring, or via any appropriate communications mediums or combination of communications mediums. Each of the devices comprises processors, examples of which are disclosed above, that are adapted to communicate with the computers. In an embodiment, each of the computers is equipped with a network communication device, for example, a network interface card, a modem, or other network connection device suitable for connecting to the data network 601. Each of the computers and the devices executes an operating system, examples of which are disclosed above. While the operating system may differ depending on the type of computer, the operating system provides the appropriate communications protocols to establish communication links with the data network 601. Any number and type of machines may be in communication with the computers.

The method and the system 300 disclosed herein are not limited to a particular computer system platform, processor, operating system, or network. In an embodiment, one or more aspects of the method and the system 300 disclosed herein are distributed among one or more computer systems, for example, servers configured to provide one or more services to one or more client computers, or to perform a complete task in a distributed system. For example, one or more aspects of the method and the system 300 disclosed herein are performed on a client-server system that comprises components distributed among one or more server systems that perform multiple functions according to various embodiments. These components comprise, for example, executable, intermediate, or interpreted code, which communicate over the data network 601 using a communication protocol. The method and the system 300 disclosed herein are not limited to be executable on any particular system or group of systems, and are not limited to any particular distributed architecture, network, or communication protocol.

The foregoing examples have been provided merely for the purpose of explanation and are in no way to be construed as limiting of the method and the system 300 disclosed herein. While the method and the system 300 have been described with reference to various embodiments, it is understood that the words, which have been used herein, are words of description and illustration, rather than words of limitation. Further, although the method and the system 300 have been described herein with reference to particular means, materials, and embodiments, the method and the system 300 are not intended to be limited to the particulars disclosed herein; rather, the method and the system 300 extend to all functionally equivalent structures, methods and uses, such as are within the scope of the appended claims. Those skilled in the art, having the benefit of the teachings of this specification, may effect numerous modifications thereto and changes may be made without departing from the scope and spirit of the method and the system 300 disclosed herein in their aspects.

We claim:

1. A method for placing a missed call from a source number of a calling party device to a destination number of a called party device, said method employing a missed call management system comprising at least one processor configured to execute computer program instructions for performing said method, said method comprising:
   receiving at a missed call management system server, a communication from a missed call client application implemented on said calling party device, to provide a missed call indication to a destination number;
   receiving said source number and said destination number from said calling party device through one of a data network and a telecommunication network, by said missed call management system, based on a presence of connectivity between said calling party device and said one of said data network and said telecommunication network, as detected by said missed call client application;
   determining a qualification score of one or more of said calling party and said called party, by said missed call client application, based on one or more of:
      a likelihood of said called party making a callback, comprising one or more of a high frequency of call attempts that are successfully answered, a high average recharge amount, a higher average balance in the called party's prepaid account, a higher average amount recharged and/or spent per unit time, a high average call duration of calls attempted and calls answered, a low percentage of calls attempted with an insufficient balance, length of using the carrier network's service and making the answered calls; and
      a likelihood of said calling party receiving a callback, comprising one or more of a high frequency of said calling party receiving calls that are answered, a high rate of said calling party answering incoming calls, a high average call duration of the incoming calls to said calling party, a low rate of attempting calls that are disconnected by said calling party, length of using services offered by said one of said data network and said telecommunication network by said calling party, and making and receiving answered calls by said calling party;
   determining whether said qualification score qualifies said placement of said missed call from said source number of said calling party device to said destination number of said called party device, by said missed call management system;
   making a call to said destination number of said called party device with an identification of an originator of said call as said source number, by said missed call management system, when said qualification score qualifies one of said calling party and said called party for the placement of the missed call; and
   terminating said call, when said call successfully reaches said destination number prior to completion of said call, such that said missed call indication is provided to said called party, by said missed call management system.

2. The method of claim 1, further comprising sending a status of said placement of said missed call from said source number of said calling party device to said destination number of said called party device, by said missed call management system, to said missed call client application implemented on said calling party device.

3. The method of claim 1, wherein said reception of said source number and said destination number from said calling party device through said telecommunication network, by said missed call management system, is performed using one of a voice network, an unstructured supplementary service data gateway, and a short message service center.

4. The method of claim 1, wherein said source number is one of a plurality of numbers associated with said calling party device.

5. The method of claim 4, further comprising authenticating and validating said plurality of said numbers, by said missed call management system, in communication with said missed call client application implemented on said calling party device, to obtain said source number.

6. The method of claim 1, further comprising sending a missed call alert notification to said destination number of said called party device, by said missed call management system, when said placement of said call to said destination number is unsuccessful.

7. The method of claim 1, wherein said placement of said missed call from said source number of said calling party device to said destination number of said called party device is performed by said missed call management system using a missed call server that is in one of a same geographical location and a different geographical location as that of said one of said data network and said telecommunication network of one of said source number, said destination number, and a combination thereof.

8. The method of claim 1, wherein an indication of said missed call placed by said missed call management system is identical to that of a call from said calling party device missed by said called party device due to a failure to pick up said call by said called party device.

9. A non-transitory computer readable storage medium having embodied thereon, computer program codes comprising instructions executable by at least one processor for placing a missed call from a source number of a calling party device to a destination number of a called party device, said computer program codes comprising:
   a first computer program code for receiving at a missed call management system server, a communication from a missed call client application implemented on said calling party device, to provide a missed call indication to a destination number;
   a second computer program code for receiving said source number and said destination number from said calling party device through one of a data network and a telecommunication network based on a presence of connectivity between said calling party device and said one of said data network and said telecommunication network, as detected by said missed call client application implemented on said calling party device, wherein said source number is one of a plurality of numbers associated with said calling party device;
   a third computer program code for determining a qualification score of one or more of said calling party and said called party, based on one or more of:
      a likelihood of said called party making a callback, comprising one or more of a high frequency of call attempts that are successfully answered, a high average recharge amount, a higher average balance in the called party's prepaid account, a higher average amount recharged and/or spent per unit time, a high average call duration of calls attempted and calls answered, a low percentage of calls attempted with an insufficient balance, length of using the carrier network's service and making the answered calls; and a likelihood of said calling party receiving a callback, comprising one or more of a high frequency of said calling party receiving calls that are answered, a high rate of said calling party answering incoming calls, a high average call duration of the incoming calls to said calling party, a low rate of attempting calls that are disconnected by said calling party, length of using services offered by said one of said data network and said telecommunication network by said calling party, and making and receiving answered calls by said calling party;

a fourth computer program code for determining whether said qualification score qualifies said placement of said missed call from said source number of said calling party device to said destination number of said called party device;

a fifth computer program code for placing a call to said destination number of said called party device with an identification of an originator of said call as said source number, when said qualification score qualifies one of said calling party and said called party for the placement of the missed call; and a sixth computer program code for terminating said call when said call successfully reaches said destination number prior to completion of said call, such that said missed call indication is provided to said called party.

10. The non-transitory computer readable storage medium of claim 9, wherein said computer program codes further comprise a sixth seventh computer program code for sending a status of said placement of said missed call from said source number of said calling party device to said destination number of said called party device to said missed call client application implemented on said calling party device.

11. The non-transitory computer readable storage medium of claim 9, wherein said computer program codes further comprise a seventh an eighth computer program code for authenticating and validating said plurality of said numbers, in communication with said missed call client application implemented on said calling party device, to obtain said source number.

12. The non-transitory computer readable storage medium of claim 9, wherein said computer program codes further comprise a ninth computer program code for sending a missed call alert notification to said destination number of said called party device when said placement of said call to said destination number is unsuccessful.

13. The method of claim 1, wherein said communication comprises a captured intent of a calling party to call a called party notwithstanding said calling party having insufficient credit for one or more of said voice communication, said short message service communication, and said data communication.

14. The non-transitory computer readable storage medium of claim 9, wherein said communication comprises a captured intent of a calling party to call a called party notwithstanding said calling party having insufficient credit for one or more of said voice communication, said short message service communication, and said data communication.

15. A method for placing a missed call from a source number of a calling party device to a destination number of a called party device, said method comprising:

capturing, by a missed call client application on said calling party device, an intent of a calling party to call and to leave a missed call indication to a called party, notwithstanding said calling party having insufficient credit for one or more of a voice communication, a short message service communication, and a data communication;

receiving at a missed call management system server, a communication from said missed call client application implemented on said calling party device, to provide a missed call indication to a destination number;

receiving said source number and said destination number from said calling party device through one of a data network and a telecommunication network, by said missed call management system server, based on a presence of connectivity between said calling party device and said one of said data network and said telecommunication network as detected by said missed call client application;

determining a qualification score of one or more of said calling party and said called party, by said missed call client application, based on one or more of:

a likelihood of said called party making a callback, comprising one or more of a high frequency of call attempts that are successfully answered, a high average recharge amount, a higher average balance in the called party's prepaid account, a higher average amount recharged and/or spent per unit time, a high average call duration of calls attempted and calls answered, a low percentage of calls attempted with an insufficient balance, length of using the carrier network's service and making the answered calls; and a likelihood of said calling party receiving a callback, comprising one or more of a high frequency of said calling party receiving calls that are answered, a high rate of said calling party answering incoming calls, a high average call duration of the incoming calls to said calling party, a low rate of attempting calls that are disconnected by said calling party, length of using services offered by said one of said data network and said telecommunication network by said calling party, and making and receiving answered calls by said calling party;

determining whether said qualification score qualifies said placement of said missed call from said source number of said calling party device to said destination number of said called party device, by said missed call management system;

making a call to said destination number of said called party device with an identification of an originator of said call as said source number, by said missed call management system server, when said qualification score qualifies one of said calling party and said called party for the placement of the missed call; and terminating said call, by said missed call management system server, when said call successfully reaches said destination number prior to completion of said call, wherein said missed call indication is provided to said called party.

* * * * *